United States Patent
Lin et al.

(10) Patent No.: US 11,637,670 B2
(45) Date of Patent: Apr. 25, 2023

(54) METHOD AND APPARATUS FOR CSI-RS IN RRC_IDLE/INACTIVE STATE

(71) Applicant: Samsung Electronics Co., Ltd., Suwon-si (KR)

(72) Inventors: Qiongjie Lin, Sunnyvale, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 17/249,288

(22) Filed: Feb. 25, 2021

(65) Prior Publication Data

US 2021/0288773 A1 Sep. 16, 2021

Related U.S. Application Data

(60) Provisional application No. 63/050,494, filed on Jul. 10, 2020, provisional application No. 62/990,654, (Continued)

(51) Int. Cl.
*H04L 5/00* (2006.01)
*H04W 72/04* (2023.01)
(Continued)

(52) U.S. Cl.
CPC ......... *H04L 5/0048* (2013.01); *H04W 56/001* (2013.01); *H04W 72/042* (2013.01); *H04W 72/044* (2013.01)

(58) Field of Classification Search
CPC .............. H04L 5/0048; H04W 56/001; H04W 72/042; H04W 72/044; H04W 56/0015
See application file for complete search history.

(56) References Cited

U.S. PATENT DOCUMENTS

2019/0215117 A1 7/2019 Lee et al.
2019/0327710 A1 10/2019 Liu et al.
(Continued)

FOREIGN PATENT DOCUMENTS

WO 2018/128410 A1 7/2018
WO 2020/038546 A1 2/2020

OTHER PUBLICATIONS

"5G; NR; Physical channels and modulation (3GPP TS 38.211 version 15.5.0 Release 15)", ETSI TS 138 211 V15.5.0, Apr. 2019, 98 Pages.
(Continued)

*Primary Examiner* — Kiet Tang

(57) ABSTRACT

Methods and apparatus for channel state information reference signal (CSI-RS) in RRC_IDLE/INACTIVE state. A method for operating a user equipment (UE) includes receiving a first configuration for periodic CSI-RS/tracking reference signal (TRS) reception occasions for idle/inactive UEs. A periodic CSI-RS/TRS reception occasion includes one or more CSI-RS resources, and each of the one or more CSI-RS resources is associated with a spatial reception parameter. The method further includes receiving a second configuration for a paging occasion (PO). The PO includes a number of physical downlink control channel (PDCCH) reception occasions The method further includes receiving an availability indication for one or more periodic CSI-RS/TRS reception occasions from the periodic CSI-RS reception occasions, receiving the one or more periodic CSI-RS/TRS reception occasions in time before the PO; and determining a time or frequency offset based on the one or more periodic CSI-RS/TRS reception occasions.

20 Claims, 20 Drawing Sheets

Related U.S. Application Data filed on Mar. 17, 2020, provisional application No. 62/988,084, filed on Mar. 11, 2020, provisional application No. 62/987,542, filed on Mar. 10, 2020.

(51) Int. Cl.
  *H04W 56/00* (2009.01)
  *H04W 72/044* (2023.01)

(56) References Cited

U.S. PATENT DOCUMENTS

| | | |
|---|---|---|
| 2019/0379431 A1 | 12/2019 | Park et al. |
| 2020/0059891 A1* | 2/2020 | Huang .................. H04W 76/27 |
| 2020/0137602 A1* | 4/2020 | Zhang ................. H04W 72/042 |
| 2021/0218454 A1* | 7/2021 | Nam ..................... H04L 5/0091 |

OTHER PUBLICATIONS

"5G; NR; Multiplexing and channel coding (3GPP TS 38.212 version 15.5.0 Release 15)", ETSI TS 138 212 V15.5.0, May 2019, 104 pages.

"5G; NR; Physical layer procedures for control (3GPP TS 38.213 version 15.5.0 Release 15)", ETSI TS 138 213 V15.5.0, May 2019, 106 pages.

"5G; NR; Physical layer procedures for data (3GPP TS 38.214 version 15.5.0 Release 15)", ETSI TS 138 214 V15.5.0, May 2019, 105 pages.

"3rd Generation Partnership Project; Technical Specification Group Radio Access Network; NR; Physical layer measurements, (Release 15)", 3GPP TS 38.215 V15.5.0, Jun. 2019, 16 pages.

"5G; NR; Medium Access Control (MAC) protocol specification (3GPP TS 38.321 version 15.5.0 Release 15)", ETSI TS 138 321 V15.5.0, May 2019, 80 pages.

"5G; NR; Radio Resource Control (RRC); Protocol specification (3GPP TS 38.331 version 15.5.1 Release 15)", ETSI TS 138 331 V15.5.1, May 2019, 488 pages.

"5G; NR; User Equipment (UE) procedures in idle mode and in RRC Inactive state (3GPP TS 38.304 version 15.5.0 Release 15)", ETSI TS 138 304 V15.5.0, Oct. 2019, 31 pages.

"3rd Generation Partnership Project; Technical Specification Group Radio Access Network; NR; Requirements for support of radio resource management, (Release 16)", 3GPP TS 38.133 V16.0.0, Jun. 2019, 999 pages.

Juho Lahdenpera, "On Feasibility of the UE Power Saving Signal for the 5G New Radio", Master's Thesis, University of Oulu, May 2019, 61 pages.

International Search Report dated Jun. 17, 2021 in connection with International Patent Application No. PCT/KR2021/002924, 3 pages.

\* cited by examiner

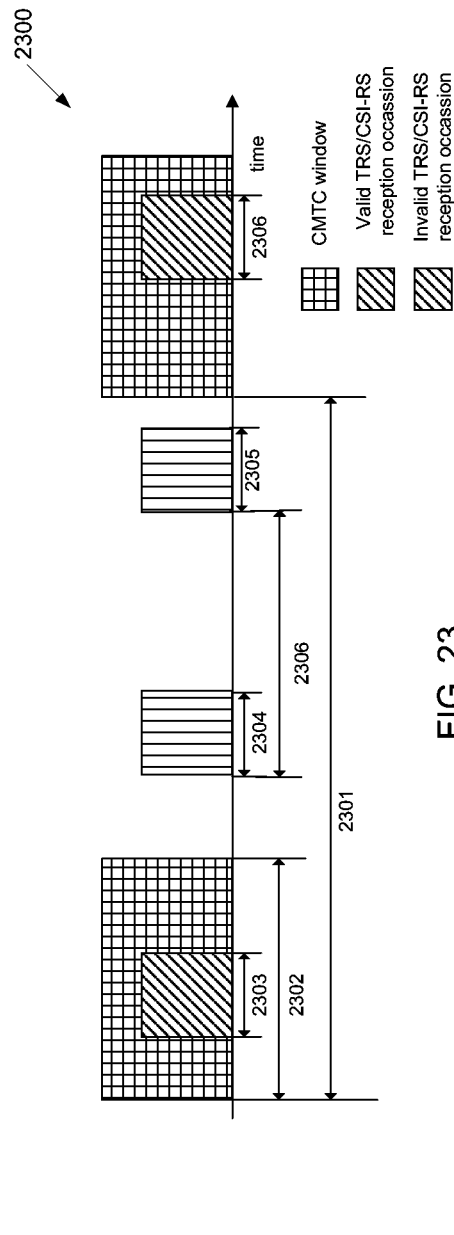
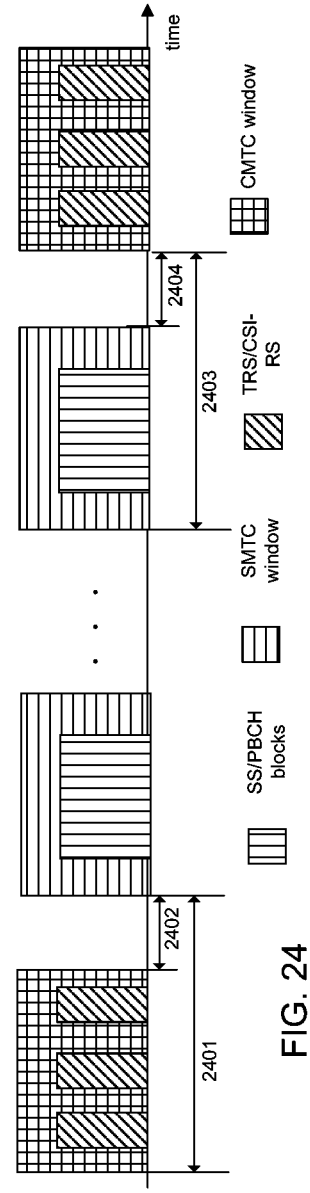
FIG. 23
FIG. 24

METHOD AND APPARATUS FOR CSI-RS IN RRC_IDLE/INACTIVE STATE

CROSS-REFERENCE TO RELATED APPLICATIONS AND CLAIM OF PRIORITY

The present application claims priority to: U.S. Provisional Patent Application No. 62/987,542, filed on Mar. 10, 2020; U.S. Provisional Patent Application No. 62/988,084, filed on Mar. 11, 2020; U.S. Provisional Patent Application No. 62/990,654, filed on Mar. 17, 2020; and U.S. Provisional Patent Application No. 63/050,494, filed on Jul. 10, 2020. The content of the above-identified patent document is incorporated herein by reference.

TECHNICAL FIELD

The present disclosure relates generally to wireless communication systems and, more specifically, the present disclosure relates to channel status information (CSI-RS) in a radio resource control (RRC) state.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to CSI-RS in an RRC state.

In one embodiment, user equipment (UE) is provided. The UE includes a transceiver configured to receive a first configuration for periodic CSI-RS/tracking reference signal (TRS) reception occasions for idle/inactive UEs. A periodic CSI-RS/TRS reception occasion includes one or more CSI-RS resources, and each of the one or more CSI-RS resources is associated with a spatial reception parameter. The transceiver is configured to receive a second configuration for a paging occasion (PO). The PO includes a number of physical downlink control channel (PDCCH) reception occasions. The transceiver is configured to receive an availability indication for one or more periodic CSI-RS/TRS reception occasions from the periodic CSI-RS reception occasions and the one or more periodic CSI-RS/TRS reception occasions in time before the PO. The UE further includes a processor operably connected to the transceiver. The processor is configured to determine a time or frequency offset based on the one or more periodic CSI-RS/TRS reception occasions.

In another embodiment, a base station (BS) is provided. The BS includes a processor and a transceiver operably connected to the processor. The transceiver is configured to transmit a first configuration for periodic CSI-RS/TRS transmission occasions for idle/inactive UEs. A periodic CSI-RS/TRS transmission occasion includes one or more CSI-RS resources, and each of the one or more CSI-RS resources is associated with a spatial transmission parameter. The transceiver is configured to transmit a second configuration for a PO. The PO includes a number of PDCCH transmission occasions. The transceiver is configured to transmit an availability indication for one or more periodic CSI-RS/TRS transmission occasions from the periodic CSI-RS transmission occasions and the one or more periodic CSI-RS/TRS transmission occasions in time before the PO.

In yet another embodiment, a method is provided. The method includes receiving a first configuration for periodic CSI-RS/TRS reception occasions for idle/inactive UEs. A periodic CSI-RS/TRS reception occasion includes one or more CSI-RS resources, and each of the one or more CSI-RS resources is associated with a spatial reception parameter. The method further includes receiving a second configuration for a PO. The PO includes a number of PDCCH reception occasions The method further includes receiving an availability indication for one or more periodic CSI-RS/TRS reception occasions from the periodic CSI-RS reception occasions, receiving the one or more periodic CSI-RS/TRS reception occasions in time before the PO; and determining a time or frequency offset based on the one or more periodic CSI-RS/TRS reception occasions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 23 illustrates yet another example of TRS/CSI-RS validation according to embodiments of the present disclosure;

FIG. 24 illustrates an example timeline for TRS/CSI-RS validation according to embodiments of the present disclosure;

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.5.0, "NR; Physical channels and modulation"; 3GPP TS 38.212 v15.5.0, "NR; Multiplexing and Channel coding"; 3GPP TS 38.213 v15.5.0, "NR; Physical Layer Procedures for Control"; 3GPP TS 38.214 v15.5.0, "NR; Physical Layer Procedures for Data"; 3GPP TS 38.215 v15.5.0, "NR; Physical layer measurements"; 3GPP TS 38.321 v15.5.0, "NR; Medium Access Control (MAC) protocol specification"; and 3GPP TS 38.331 v15.5.0, "NR; Radio Resource Control (RRC) Protocol Specification"; 3GPP TS 38.304 v15.5.0, "NR; User Equipment (UE) procedures in Idle mode and RRC Inactive State"; and 3GPP TS 38.133 v16.0.0, "NR; Requirements for support of radio resource management."

Figure 1:
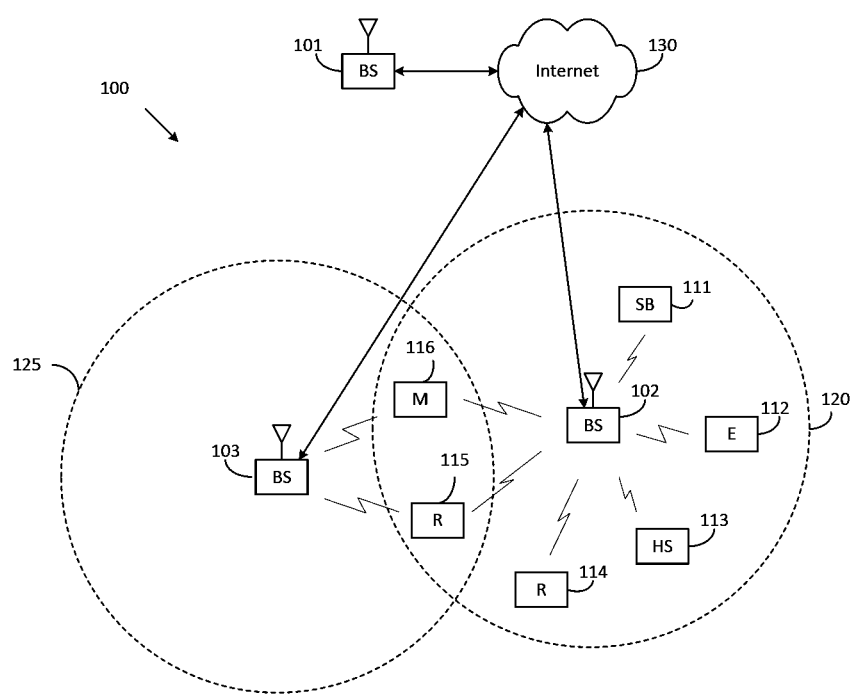
FIG. 1 illustrates an example wireless network according to embodiments of the present disclosure.
Figure 2:
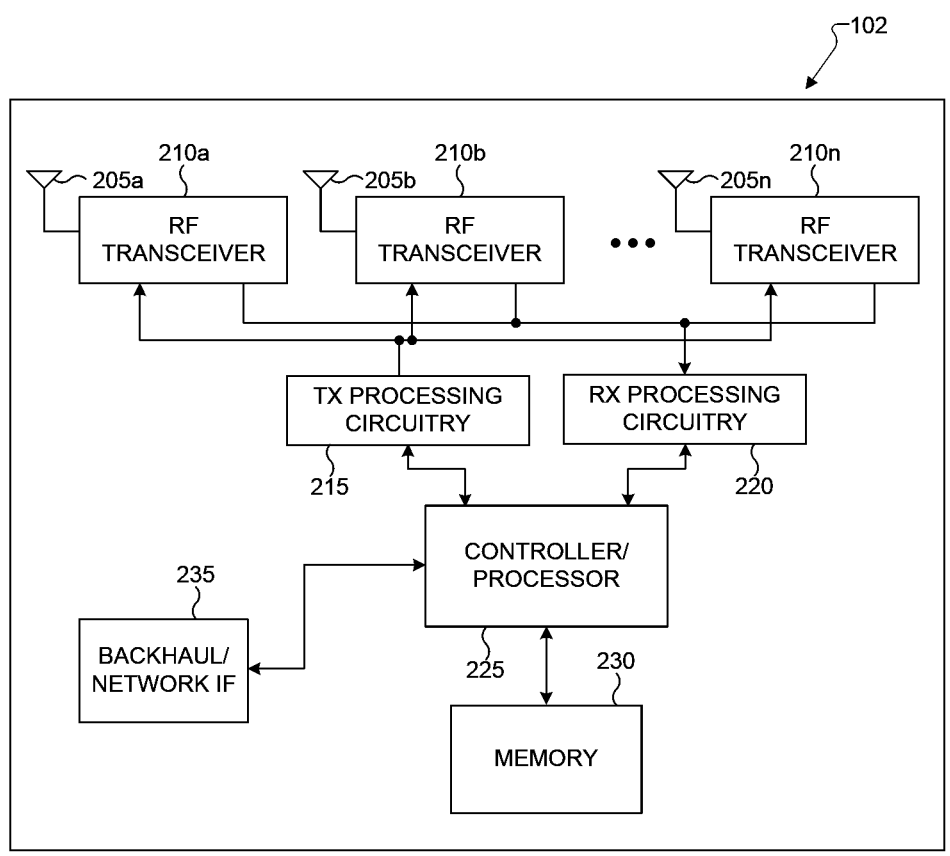
FIG. 2 illustrates an example gNB according to embodiments of the present disclosure.
Figure 3:
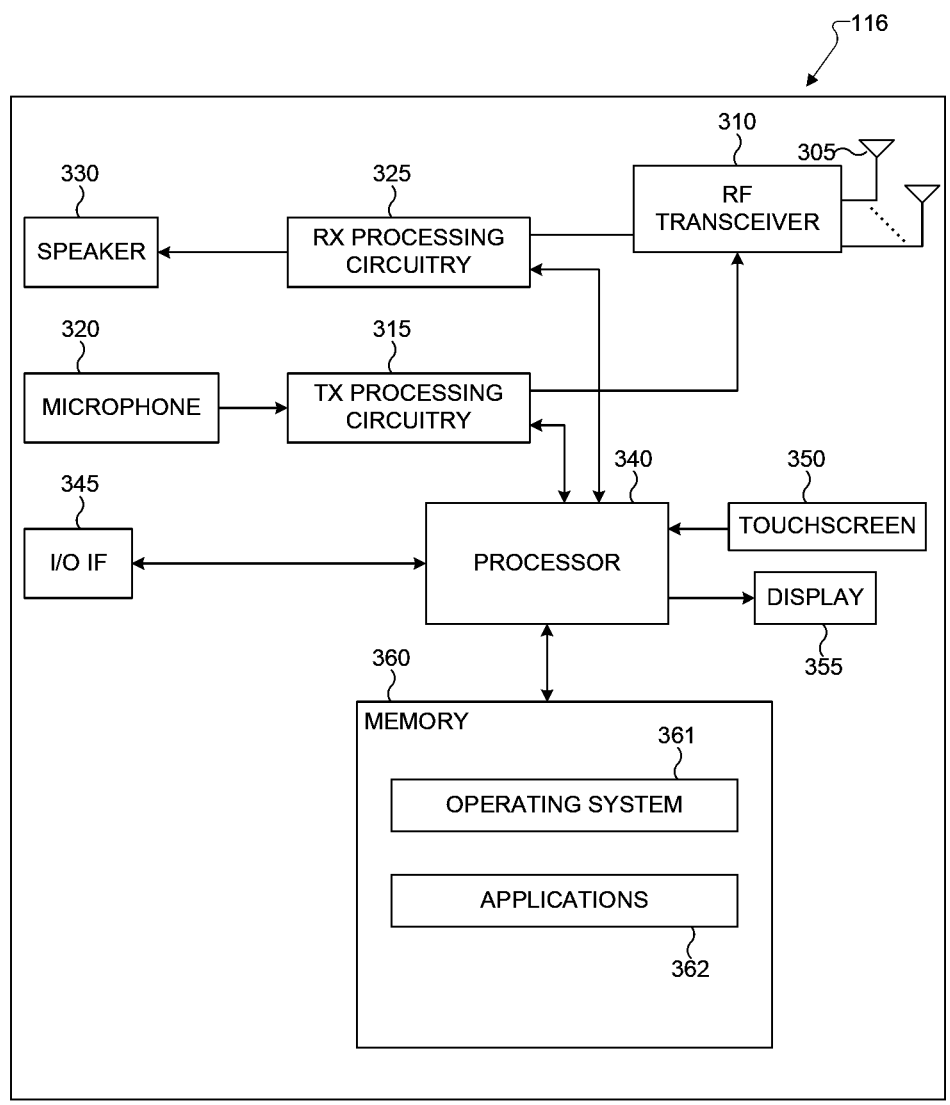
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA)

communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), LTE-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally provided a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for reception of a CSI-RS in an RRC state. In certain embodiments, and one or more of the gNBs 101-103 includes circuitry, programming, or a combination thereof for transmission of a CSI-RS in an RRC state.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/ incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for random access procedures. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is provided to be implemented in higher frequency (mmWave) bands, e.g., 28 GHz or 60 GHz bands, so as to accomplish higher data rates or in lower frequency bands, such as 6

GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A demodulation reference signal (DM-RS) is transmitted only in the BW of a respective PDCCH or PDSCH and a UE can use the DMRS to demodulate data or control information.

Figure 4:
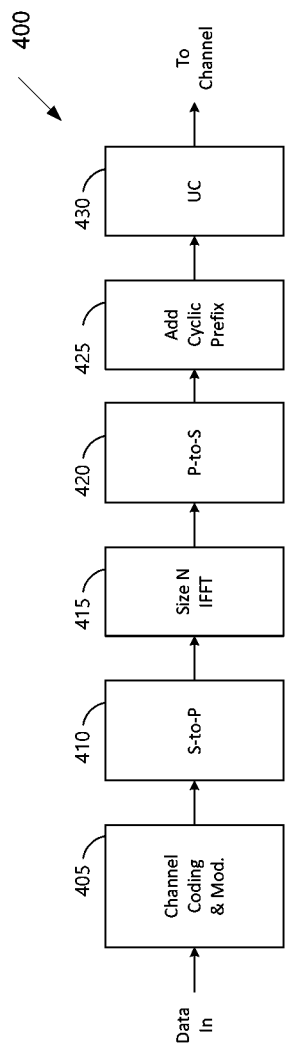
FIGS. 4 and 5 illustrate example wireless transmit and receive paths according to this disclosure.
Figure 5:
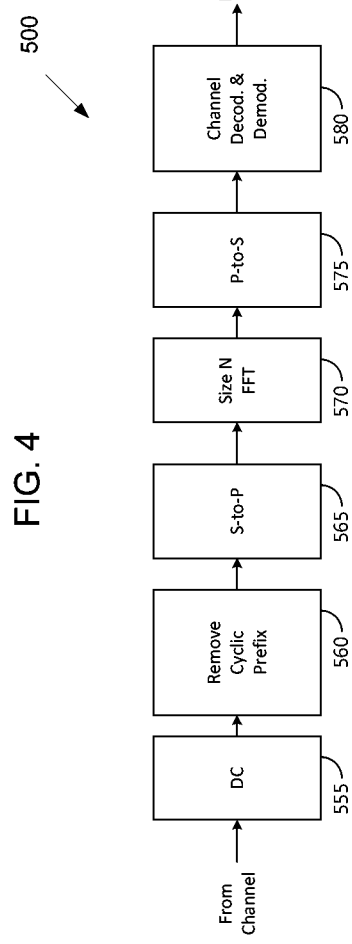

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be also understood that the receive path 500 can be implemented in a gNB and that the transmit path 400 can be implemented in a UE. In some embodiments, the receive path 500 is configured to support the reception of a CSI-RS in an RRC state as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For a UE operates in RRC_IDLE/INACTIVE state, the UE can be configured to monitoring Type2-PDCCH for paging message per discontinuous reception (DRX) cycle. The paging messages are sent by a MME to all gNodeBs in a tracking area and those gNodeBs in a tracking area are transmitting the same paging message. For 5G NR, a paging occasion (PO) is a set of PDCCH monitoring occasions and can consist of multiple time slots (e.g., subframe or OFDM symbol) where paging DCI can be sent. The PDCCH monitoring occasions (MOs) of paging are determined according to paingSearchSapce as specified in standard specification.

Except for paging monitoring, a UE in RRC_IDLE/INACTIVE state may perform radio resource management (RRM) measurement for cell reselection. In 5G NR, synchronization signal/physical broadcasting channel (SS/PBCH) block (SSB) is used for RRM measurement, and both secondary synchronization signal (SSS) and DMRS of NR-PBCH can be used as the RS for IDLE/INACTIVE mode RRM measurement.

Figure 6A:
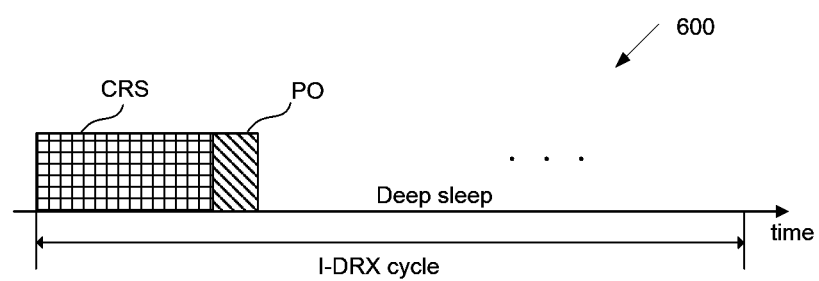
FIG. 6A illustrates an example of DL signal monitoring or reception for LTE according to embodiments of the present disclosure.
Figure 6B:
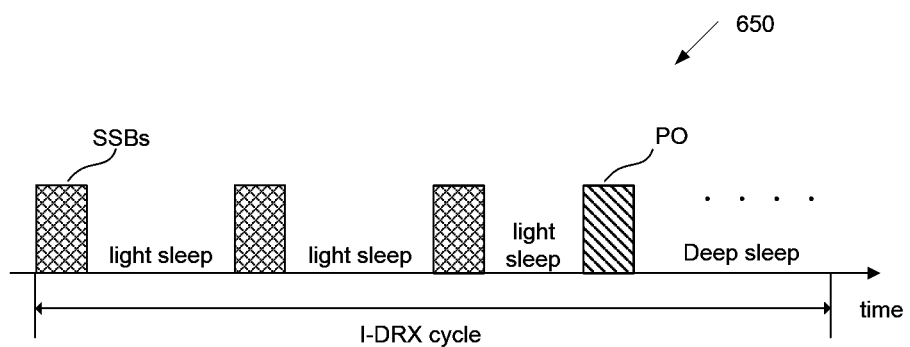
FIG. 6B illustrates an example of DL signal monitoring or reception for NR according to embodiments of the present disclosure.

FIG. 6A illustrates an example DL signal monitoring or reception for LTE 600 according to embodiments of the present disclosure. An embodiment of the DL signal monitoring or reception for LTE 600 shown in FIG. 6A is for illustration only. FIG. 6B illustrates an example DL signal monitoring or reception for NR 650 according to embodiments of the present disclosure. An embodiment of the DL signal monitoring or reception for NR 650 shown in FIG. 6B is for illustration only.

As illustrated in FIGS. 6A and 6B, UE power consumption for operating in RRC_IDLE/INACTIVE state can be increased a lot for 5G NR compared with LTE. One issue related to higher UE power consumption in idle/inactive state for 5G NR is longer wake up time for RRM measurement and paging monitoring. A UE may measure the synchronization signal reference signal received power (SS-RSRP) and synchronization signal reference signal received quality (SS-RSRQ) level of serving cell and evaluate the cell selection criterion S for the serving cell at least once every M1*N1 DRX cycle, which is known as RRM measurement period. M1=2 if a SS/PBCH block measurement time configuration (SMTC) periodicity (TSMTC)>20 ms and DRX cycle≤0.64 second, otherwise M1=1. To achieve the measurement accuracy requirement, a UE may need to perform multiple L1 measurement samples for noise smoothing within a RRM measurement period. Due to the distributive SSB burst sets in physical layer as illustrated in FIG. 6B, a UE may need to wake up multiple times to process multiple L1 RSRP or RSRQ measurement samples.

In addition to RSRP or RSRQ measurement, a UE also rely on SSB for running all necessary loops (e.g., automatic gain control (AGC), time tracking loop (TTL), and frequency tracking loops (FTL)) after wake-up from a sleep mode. A UE has to at least keep light sleep during the time gap between SSBs for loop convergence or RRM measurement and the time gap between the closest SSB to an associated PO. To reduce the wake-up time of UE without impact the UE's mobility performance, additional RS can be introduced for RRM measurement.

Therefore, there is a need to determine a configuration of channel state information-reference-signal/tracking reference signal (CSI-RS/TRS) resources for a UE operates in RRC_IDLE/INACTIVE state. The configuration can include DL BWP or subcarrier spacing (SCS) configuration µ or resource blocks (RBs) or resource element (RE) mapping or the OFDM symbols, or the first slot, or duration, or number of antenna ports, transmit power of the idle mode CSI-RS/TRS.

There is another need to determine quasi co-location (QCL) assumption for idle mode CSI-RS/TRS reception. There is yet another need to determine resource type of idle mode CSI-RS/TRS. There is yet another need to determine rate matching for downlink physical layer channel reception impacted by idle mode CSI-RS/TRS. There is yet another need to determine UE behavior for idle mode CSI-RS/TRS reception in case of collision with other physical layer signal/channel. There is yet another need to determine sequence generation of idle mode CSI-RS/TRS.

The present disclosure relates to determining a configuration of CSI-RS/TRS resources for at least a UE operates in RRC_IDLE/INACTIVE state, which is referred as idle mode CSI-RS/TRS in this disclosure. The disclosure further relates to determining QCL assumption for idle mode CSI-RS/TRS reception. The present disclosure additionally relates to determining resource type of idle mode CSI-RS/TRS. The present disclosure additionally relates to determining rate matching for downlink physical layer channel reception impacted by idle mode CSI-RS/TRS. The present disclosure additionally relates to UE behavior for idle mode CSI-RS/TRS reception in case of collision with other physical layer signal/channels. The disclosure finally relates to determining sequence generation of idle mode CSI-RS/TRS.

This present disclosure provides CSI-RS/TRS transmitted from a cell to at least UEs operate in RRC_INACTIVE/IDLE state. The cell can be a serving cell or a neighboring cell, wherein the UE performs RRM measurement for the neighboring cell. The CSI-RS/TRS can be used by the UE in RRC_IDLE/INACTIVE state for at least one of time/frequency tracking or CSI computation or L1-RSRP computation or RRM measurement. The CSI-RS/TRS is referred as idle mode CSI-RS/TRS in this disclosure. A cell can provide a UE S>=1 idle mode CSI-RS/TRS resources set(s), wherein each idle mode CSI-RS/TRS resource set consists of N>=1 CSI-RS/TRS resource(s).

In one embodiment, a configuration of idle mode CSI-RS/TRS transmitted from a cell to a UE is provided. A UE can be provided with M>=1 configuration(s) of idle mode CSI-RS/TRS for M>=1 cells. ID of a cell where a UE expects to receive idle mode CSI-RS/TRS from the cell can be included in the configuration of the idle mode CSI-RS/TRS for the cell.

For receiving the configuration of idle mode CSI-RS/TRS for a cell from a serving cell, a UE can assume at least one of the following examples.

In one example, the UE receives the configuration as part of system information of the serving cell. The UE receives the configuration in a PDSCH that is scheduled by a DCI format with CRC scrambled by system information-RNTI (SI-RNTI). For one example, the configuration is included in remaining minimum system information (RMSI). For another example, the configuration is included in other system information (OSI).

In another example, the UE can receive the configuration when the UE is triggered to switch from RRC_CONNECTED state to RRC_IDLE/INACTIVE state in the serving cell. The configuration can be provided by higher layer, for example SuspendConfig in RRCRelease.

In yet another example, the UE can receive the configuration from a PBCH of the serving cell. For example, the configuration is included in master information bock (MIB).

In yet another example, the UE can receive the configuration from a PDSCH that is scheduled by a DCI format with CRC scrambled by random access-radio network temporary identifier (RA-RNTI) or temporary C-RNTI (TC-RNTI) in the serving cell. For example, the configuration can be included in msg 2 or msg 4 during RACH procedure.

In yet another example, the configuration can be provided per UE group, where a UE group ID, $n_{UE\_group}$ is associated with a UE ID, $I^{UE}$, which is used for determining paging occasion in the serving cell, such that $I^{UE}$=5G-S-TMSI mod 1024. For example, $$n_{UE\_group} = \mod\left(\left\lfloor \frac{I^{UE}}{c1} \right\rfloor, c2\right),$$

where c1 and c2 are integers, and can be either defined in the specification of the system operation or provided to the UE through higher layer signaling. In one example, c1 or c2 equals number of total paging frames in a DRX cycle. In another example, c1 or c2 equals to number of paging occasions for a paging frame (PF). In yet another example, values for c1 and c2 are included in RMSI.

For determining a DL BWP of a cell wherein a UE is expected to receive the idle mode CSI-RS/TRS transmitted from the cell, at least one of the following methods can be provided.

In one example, the DL BWP can be any configured DL bandwidth part (DL BWP) of the cell and is provided to a UE in a configuration of idle mode CSI-RS/TRS for each idle mode CSI-RS/TRS resources set or for each CSI-RS/TRS resource.

In another example, the DL BWP can be the initial DL BWP, wherein a burst of SS/PBCH blocks are transmitted in the initial DL BWP from the cell.

In yet another example, the DL BWP can be the DL BWP of the cell, wherein the UE is provided with another configuration indicating the UE to monitor paging message in the DL BWP. For example, the other configuration can indicate the search space set for PO monitoring, i.e., pagingSearchSpace. For another example, the other configuration can indicate the starting PDCCH monitoring occasion for a PO, i.e., paging firstPDCCH-MonitoringOccasionOfPO.

In yet another example, the DL BWP can be DL BWP of the cell with BWP index of zero.

In yet another example, a UE does not expect to determine the DL BWP for idle mode CSI-RS/TRS reception. The UE can be provided with RBs for idle mode CSI-RS/TRS reception, wherein the RB index is relative to common resource block 0 in the cell.

Figure 7:
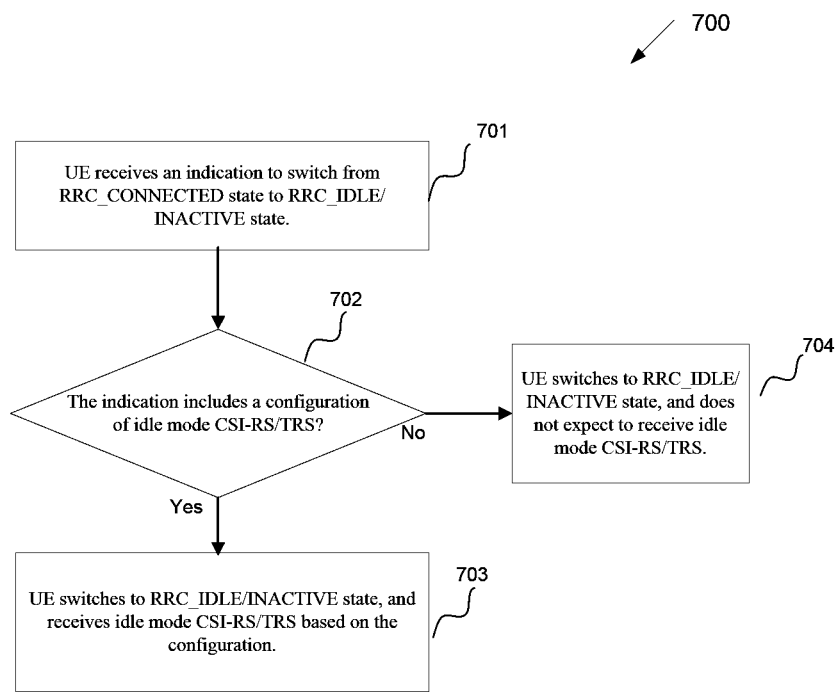
FIG. 7 illustrates a flowchart of a method of UE for receiving a configuration of idle mode CSI-RS/TRS according to embodiments of the present disclosure.

FIG. 7 illustrates a flowchart of a method 700 of UE for receiving a configuration of idle mode CSI-RS/TRS according to embodiments of the present disclosure. For example, the method 700 may be implemented by a UE, such as UE 116 in FIG. 1 An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, a UE in RRC_CONNECTED state receives an indication from higher layer to trigger the UE to switch from RRC_CONNECTED state to RRC_IDLE/INACTIVE state, at step 701. The UE then determines whether or not the indication includes a configuration of idle mode CSI-RS/TRS, at step 702. If the indication includes a configuration of idle mode CSI-RS/TRS, the UE switches to RRC_IDLE/INACTIVE state and receives idle mode CSI-RS/TRS based on the configuration, at step 703, otherwise, the UE switches to RRC_IDLE/INACTIVE state and does not expect to receive idle mode CSI-RS/TRS, at step 704.

Figure 8:
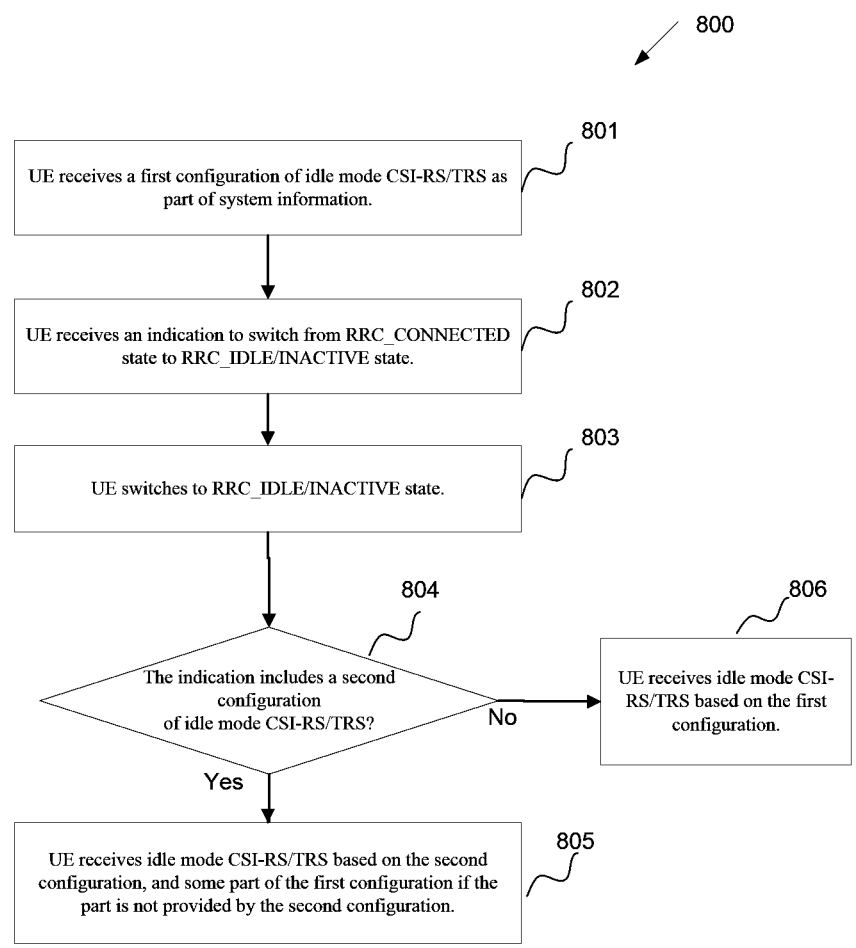
FIG. 8 illustrates another flowchart of a method of UE for receiving a configuration of idle mode CSI-RS/TRS according to embodiments of the present disclosure.

FIG. 8 illustrates another flowchart of a method 800 of UE for receive a configuration of idle mode CSI-RS/TRS according to embodiments of the present disclosure. For example, the method 800 may be implemented by a UE, such as UE 116 in FIG. 1 An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, a UE is provided with a first configuration of idle mode CSI-RS/TRS as part of system information, at step 801. The first configuration can be received by the UE during RRC_CONNECTED state or during initial access phase. The UE receives an indication to switch from RRC_CONNECTED state to RRC_IDLE/INACTIVE state, at step 802. The UE switches to RRC_IDLE/INACTIVE state based on the indication, at step 803. The UE then determines whether or not the indication includes a second configuration of idle mode CSI-RS/TRS, at step 804. If the indication includes a second configuration of idle mode CSI-RS/TRS, the UE receives idle mode CSI-RS/TRS based on the second configuration and some part of the first configuration if the part of first configuration is not provided by the second configuration, at step 805. Otherwise, the UE receives idle mode CSI-RS/TRS based on the first configuration during RRC_IDLE/INACTIVE state, at step 806.

For determination of SCS configuration μ of idle mode CSI-RS/TRS, at least one of the following methods can be provided.

In one example, SCS configuration μ of idle mode CSI-RS/TRS can be provided to a UE in a configuration of idle mode CSI-RS/TRS for each idle mode CSI-RS/TRS resources set or for each CSI-RS/TRS resource.

In another example, a UE assumes the SCS configuration is same as the SCS of a DL BWP where the UE expects to receive the idle mode CSI-RS/TRS in the DL BWP.

For determining occupied RBs, denoted as $N_{RBs}$, and a reference point for resource configuration of idle mode CSI-RS/TRS in the frequency domain, wherein a UE assumes idle mode CSI-RS/TRS resources are mapped into the $N_{RBs}$ continuous RBs starting from the reference point, at least one of the following approaches can be provided.

In one example, $N_{RBs}$ or the reference point can be provided to a UE in a configuration of idle mode CSI-RS/TRS for each idle mode CSI-RS/TRS resources set or for each CSI-RS/TRS resource. In one instance, the reference point can be number of RBs or subcarriers relative to subcarrier 0 in common resource block 0. In another instance, the reference point can be number of RBs or subcarriers relative to subcarrier 0 in the DL BWP where the UE expects to receive the associated CSI-RS/TRS resources.

In another example, the reference point can be the subcarrier 0 in common resource block 0.

In yet another example, the reference point can be subcarrier 0 in the DL BWP where the UE expects to receive the idle mode CSI-RS/TRS resources.

In one example, $N_{RBs}$ can be defined in the specification of the system operation. For example, $N_{RBs}=20$.

In one example, $N_{RBs}$ equals to the bandwidth of the DL BWP, where a UE expects to receive the idle mode CSI-RS/TRS.

For determining RE mapping within available RBs in the frequency domain, a UE can assume an idle mode CSI-RS/TRS resource is mapped into one subcarrier per every $N_{SC}^{RS} \geq 1$ continuous subcarriers across occupied RBs. For an occupied RB with index, $n_{RB}$, a UE assumes the subcarriers with subcarrier index, k, can be used for idle mode CSI-RS/TRS reception/transmission, such that $$k = n_{RB} \cdot N_{SCs}^{RB} + k_0 + N_{SC}^{RS} \cdot i, \text{ for } i = 0, \ldots, \frac{N_{SCs}^{RB}}{N_{SC}^{RS}} - 1,$$

where $N_{SCs}^{RB}$ is number of subcarriers per RB, $k_0$ is an integer, and $0 \leq k_0 \leq N_{SC}^{RS}$. In one approach for determining $k_0$ or $N_{SC}^{RS}$, $k_0$ or $N_{SC}^{RS}$ can be provided to a UE in a configuration of idle mode CSI-RS/TRS for each idle mode CSI-RS/TRS resources set or for each CSI-RS/TRS resource. In another approach for determining $k_0$ or $N_{SC}^{RS}$, $k_0$ or $N_{SC}^{RS}$ can be defined in the specification of system operation, for example, $k_0=0$, $N_{SC}^{RS}=1$. In yet another approach for determining $k_0$ or $N_{SC}^{RS}$, $k_0$ or $N_{SC}^{RS}$ can be determined based on a predetermined density and a CDM type. The density indicates number of REs allocated per antenna port in a PRB for a CSI-RS/TRS resource. $k_0$ or $N_{SC}^{RS}$ can be determined according to predetermined RE mapping pattern based on the density and the CDM type defined in REF 1. The density or CDM type can either be provided to the UE in the configuration of the CSI-RS/TRS resources or defined in the specification of the system operation. For example, density equals to 0.5, or 1 or 3. For another example, the density is predetermined to be same as a TRS defined in REF 1. For yet another example, no CDM is used for the CSI-RS/TRS resource.

For determining OFDM symbols wherein a UE is expected to receive the idle mode CSI-RS/TRS, any of the following approaches can be provided.

In one example, a UE can be provided with the first OFDM symbol index for idle mode CSI-RS/TRS reception, denoted as $n_{first}$, and a UE assumes $N_{symbols} \geq 1$ consecutive OFDM symbols starting from the first symbol $n_{first}$ are available for idle mode CSI-RS/TRS reception. In one instance for determining $n_{first}$ or $N_{symbols}$, $n_{first}$ or $N_{symbols}$ can be provided to a UE in a configuration of idle mode CSI-RS/TRS for each idle mode CSI-RS/TRS resources set or for each CSI-RS/TRS resource. In another instance for determining $n_{first}$ or $N_{symbols}$, $n_{first}$ or $N_{symbols}$ can be defined in the specification of the system operation, for example, $n_{first}=0$, or $N_{symbols}=1$. There can be more than one CSI-RS resources within a CSI-RS/TRS reception occasion. A bitmap can be provided to the UE to indicate more than one first OFDM symbols for CSI-RS resources reception within the CSI-RS/TRS reception occasion or within a slot.

In one example, a UE can be provided with a bitmap to indicate the OFDM symbols for idle mode CSI-RS/TRS reception, wherein a bit with value 1 indicates the associated OFDM symbol is available for idle mode CSI-RS/TRS reception. The bitmap can be either provided to a UE in a configuration of idle mode CSI-RS/TRS for each idle mode CSI-RS/TRS resources set or for each CSI-RS/TRS resource or defined in the specification of the system operation. In one instance, the OFDM symbols for idle mode CSI-RS/TRS reception are symbol 4 and 8. In yet another instance, the OFDM symbols for idle mode CSI-RS/TRS reception are symbol 5 and 9. In yet another instance, the OFDM symbols for idle mode CSI-RS/TRS reception are symbol 6 and 10. The symbol index starts from 0.

For determining a first slot wherein a UE is expected to receive idle mode CSI-RS/TRS starting from the slot, a UE can be provided with periodicity, $T^{RS}$, and/or offset, $O^{RS}$, in unit of one slot, in a configuration of idle mode CSI-RS/TRS for each idle mode CSI-RS/TRS resources set or for each CSI-RS/TRS resource. The UE determines that the associated idle mode CSI-RS/TRS receptions occasions are in slot(s) starting from slot with number $n_{i,f}^\mu$, in a frame with number $n_f$ if $(n_f N_{slot}^{frame,\mu} + n_{i,f}^\mu - O^{RS})$ mod $T^{RS}=0$, where $N_{slot}^{frame,\mu}$ is number of slots per frame with SCS configuration of μ, and μ is the SCS configuration of the idle mode CSI-RS/TRS. In one instance for determining applicable value for $T^{RS}$, a number of candidate applicable values for $T^{RS}$ can be provided to the UE by higher layers. The candidate applicable values for $T^{RS}$ can be determined based on RS types, such as TRS or CSI-RS. For example, the candidate applicable values can be any of 10, 20, 40, or 80 when the RS is TRS, while the candidate applicable values can be any of 4, 5, 8, 10, 16, 20, 32, 40, 64, 80, 160, 32-, or 640 when the RS is CSI-RS rather than TRS. Alternatively, the candidate applicable values for $T^{RS}$ can be same regardless RS type. For example, the candidate applicable values for $T^{RS}$ can be any of 10, 20, 40, or 80 regardless the RS is TRS only or not.

For determining the duration in terms of a number of slots for idle mode CSI-RS/TRS reception, denoted as $n_{slots}^{RS}$, a UE can be provided with the duration for a set of n>=1 CSI-RS/TRS resources. The N>=1 CSI-RS/TRS resources can be mapped into available OFDM symbols across the $N_{slots}^{RS}>=1$ consecutive slots in the ascending order of CSI-RS/TRS index.

In one example, $N_{slots}^{RS}$ can be determined by the number of available OFDM symbols per slot for idle mode CSI-RS/TRS reception, denoted as L, and the duration in terms of occupied OFDM symbols per CSI-RS/TRS resource, i.e., $K_{symbs}^{RS}$, such that $$N_{slots}^{RS} = \left\lceil \frac{K_{symbs}^{RS} \cdot N}{L} \right\rceil.$$

In another example, $N_{slots}^{RS}$ can be determined by the duration in terms of occupied slots per CSI-RS/TRS resource, i.e., $K_{slots}^{RS}$, such that $N_{slots}^{RS} = K_{slots}^{RS} \cdot N$.

In yet another example, $N_{slots}^{RS}$ can be defined in the specification of the system operation. For example, $N_{slots}^{RS} = 1$ or 2.

For a CSI-RS/TRS resource, it can occupy $K_{symbs}^{RS} \geq 1$ OFDM symbols per slot and be repeated in $K_{slots}^{RS}$ consecutive slots with the same symbol location per slot. In one approach for determining $K_{symbs}^{RS}$ or $K_{slots}^{RS}$, $K_{symbs}^{RS}$ or $K_{slots}^{RS}$ can be provided to a UE in a configuration of idle mode CSI-RS/TRS for each CSI-RS/TRS resource. In another approach for determining $K_{symbs}^{RS}$ or $K_{slots}^{RS}$, $K_{symbs}^{RS}$ or $K_{slots}^{RS}$ can be defined in the specification of the system operation. For example, $K_{symbs}^{RS} = 1$, $K_{slots}^{RS} = 1$.

For determining number of antenna ports, denoted as $N_{ports}$, $N_{ports}$ can either be provided to a UE in a configuration of idle mode CSI-RS/TRS for each idle mode CSI-RS/TRS resources set, or defined in the specification of system operation, for example, $N_{ports} = 1$.

For determining the transmit power of idle mode CSI-RS/TRS, a UE can derive the downlink CSI-RS EPRE from the SS/PBCH block downlink transmit power given by the parameter SS-PBCH-BlockPower and CSI-RS power offset given by a parameter, e.g., powerControlOffsetSS. The CSI-RS power offset given can be provided to the UE in a configuration of idle mode CSI-RS/TRS for each idle mode CSI-RS/TRS resources set or each CSI-RS/TRS resource. The downlink reference-signal transmit power is defined as the linear average over the power contributions (in [W]) of the resource elements that carry the configured CSI-RS within the operating system bandwidth. The configuration parameter, powerControlOffsetSS, can be same as it for connected mode CSI-RS/TRS reception, which indicates the power offset of NZP CSI-RS RE to SSS RE. The candidate values for powerControlOffsetSS can be any of −3 dB, 0 dB, 3 dB or 6 dB.

In one embodiment, determining QCL assumption for idle mode CSI-RS/TRS reception is provided.

In one example for determining QCL assumption for idle mode CSI-RS/TRS reception from a cell, a UE may assume a CSI-RS/TRS resource and an SS/PBCH block in the cell is are quasi co-located with respect to a QCL type. The index of the SS/PBCH can be provided to the UE in the configuration of idle mode CSI-RS/TRS based on any approaches defined in the first embodiment of the disclosure. The QCL type can be either defined in the specification of the system operation, for example, QCL type is "QCL-TypeD" as defined in standard specification or provided to the UE in the configuration of idle mode CSI-RS/TRS based on any approaches defined in the first embodiment of the disclosure. The UE can also be provided with an indication to activate or deactivate the QCL assumption between the CSI-RS/TRS resource and the SS/PBCH block. The indication can be provided to the UE in the configuration of idle mode CSI-RS/TRS based on any approaches defined in the first embodiment of this disclosure.

In one example for determining QCL assumption for idle mode CSI-RS/TRS reception from a cell, a UE assumes each idle mode CSI-RS/TRS resource set consists of S>=1 CSI-RS/TRS resources, where S is the number of transmitted SS/PBCH blocks per burst in the cell. The UE assumes the k-th CSI-RS/TRS resource and the k-th actually transmitted SS/PBCH block is QCL with respect to Doppler spread, Doppler shift, average gain, average delay, delay spread, and, when applicable, spatial Rx parameters.

In one example for determining QCL assumption for idle mode CSI-RS/TRS reception from a cell, a UE can be provided with a TCI-State indicating QCL source RS(s) and QCL type(s) for each CSI-RS/TRS resource. The TCI-State is configured with a reference to an RS with "QCL-TypeD" association, that RS can be an SS/PBCH block located in the same or different DL BWP in the same cell with the CSI-RS/TRS resource. The TCI states can be provided to the UE in the configuration of idle mode CSI-RS/TRS based on any approaches defined in the first embodiment of this disclosure.

In one embodiment, resource type of idle mode CSI-RS/TRS is provided.

In one example, the idle CSI-RS/TRS resources can be periodic. A UE can be provided with a configuration for the periodic CSI-RS/TRS resources based on any approach defined in the first embodiment of this disclosure.

In another example, the idle CSI-RS/TRS resources can be semi-persistent. A UE can be provided with a configuration for the CSI-RS/TRS resources based on any approach defined in the first embodiment of this disclosure. In addition, the UE can be provided with an indication to indicate activated idle mode CSI-RS/TRS resources. The indication can either be provided by higher layer or as part of the configuration of idle mode CSI-RS based on any approach defined in the first embodiment of this disclosures.

In one instance, the indication can be a list of activated idle CSI-RS/TRS resources set or CSI-RS/TRS resources. A UE does not expect to receive CSI-RS/TRS that is not included in the list. In another instance, the indication can be a binary bit to indicate whether or not all the idle mode CSI-RS/TRS resources are activated. For a UE receives the binary bit, the UE does not expect to receive idle mode CSI-RS/TRS if CSI-RS/TRS are not activated. In yet another instance, the indication can be a list of cells, such that the UE expects to receive idle mode CSI-RS/TRS from a cell that is included in the list and does not expect to receive idle mode CSI-RS/TRS from a cell that is not included in the list. In yet another instance, the indication can be a list of cells, such that the UE expects to receive idle mode CSI-RS/TRS from a cell that is not included in the list and does not expect to receive idle mode CSI-RS/TRS from a cell that is included in the list.

In one example, the idle CSI-RS/TRS resources activated or deactivated based on an indication in a physical layer signal/channel. A UE can be provided with a configuration for the CSI-RS/TRS resources based on any approach defined in the first embodiment of this disclosure. In addition, the UE can be provided with an indication to indicate activated idle mode CSI-RS/TRS resources. In one example of an indication, the indication can be a list of activated idle CSI-RS/TRS resources set or CSI-RS/TRS resources. The UE does not expect to receive idle mode CSI-RS/TRS resources set or CSI-RS/TRS resource that is not included in the list. In another example of an indication, the indication can be a binary bit to indicate whether or not the idle mode CSI-RS/TRS is activated. For a UE receives the binary bit, the UE does not expect to receive idle mode CSI-RS/TRS if the binary bit indicates the idle mode CSI-RS/TRS is not activated.

For determining the physical layer signal/channel to receive the indication, any of the following can be provided by a UE. In one example, the indication is included in a PSS, e.g., the initial condition of the sequence, and/or mapping order of the sequence. In another example, the indication is included in a SSS, e.g., the initial condition of the sequence, and/or mapping order of the sequence. In yet another example, the indication is included in a DM-RS of PBCH, e.g., the initial condition of the sequence, and/or mapping order of the sequence, and/or REs mapped for the sequence. In yet another example, the indication is included in the payload of PBCH, e.g., MIB. In yet another example, the indication is included in the short message of paging PDCCH. In yet another example, the indication is included in a paging DCI format, wherein a UE receives the DCI format with CRC scrambled by P-RNTI. In yet another example, the indication is included in a DCI format that also includes another indication to indicate whether or not to receive a PO.

Figure 9:
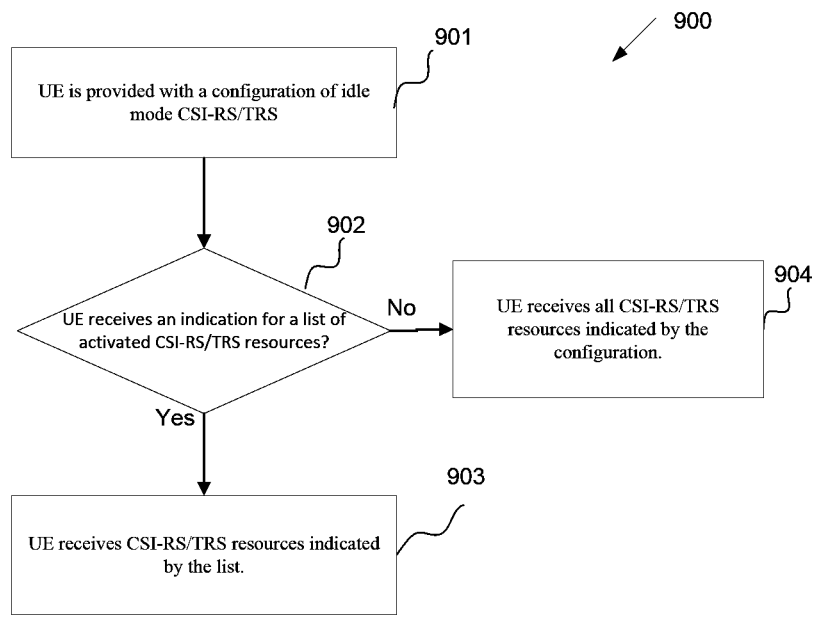
FIG. 9 illustrates a flowchart of a method of UE for receiving idle mode CSI-RS/TRS according to embodiments of the present disclosure.

FIG. 9 illustrates a flowchart of a method 900 of UE for receiving idle mode CSI-RS/TRS according to embodiments of the present disclosure. For example, the method 900 may be implemented by a UE, such as UE 116 in FIG. 1 An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a UE in RRC_IDLE/INACTIVE state is provided with a configuration of idle mode CSI-RS/TRS, for example via SuspendConfig in RRCRelease, at step 901. The UE determines whether or not the UE receives an indication for a list of activated CSI-RS/TRS resources, at step 902, for example through via RMSI or paging DCI format. If the UE receives the indication, the UE expects to receive CSI-RS/TRS resources indicated by the list and does not expect to receive CSI-RS resources that are not included in the list, at step 903; otherwise, the UE receives all the CSI-RS/TRS resources indicated by the configuration, at step 904.

In one embodiment, rate matching for downlink physical layer channel reception impacted by idle mode CSI-RS/TRS is provided, such that configured RE of the downlink physical layer overlaps with configured RE of idle mode CSI-RS/TRS.

A first downlink physical layer channel reception impacted by idle mode CSI-RS/TRS can be PBCH, a UE expects that PBCH reception is rate matched such that the UE avoids REs of PBCH DMRS and idle mode CSI-RS/TRS.

A second downlink physical layer channel reception impacted by idle mode CSI-RS/TRS can be PDSCH. For one example, when receiving the PDSCH scheduled with SI-RNTI and the system information indicator in DCI is set to 0, the UE may assume that no idle mode CSI-RS/TRS is transmitted in REs used by the UE for a reception of the PDSCH. For another example, when receiving the PDSCH scheduled with at least one of SI-RNTI and the system information indicator in DCI is set to 1, or RA-RNTI, or P-RNTI or TC-RNTI, or C-RNTI, or modulation and coding scheme-C-RNTI (MCS-C-RNTI), or configured scheduling- RNTI (CS-RNTI), or PDSCHs with SPS, the UE assumes if the PDSCH resource allocation overlaps with PRBs containing idle mode CSI-RS/TRS resources the UE may assume that the PRBs are not available for PDSCH in the OFDM symbols where idle mode CSI-RS/TRS is transmitted.

In yet another example, when receiving the PDSCH scheduled with at least one of SI-RNTI and the system information indicator in DCI is set to 1, or RA-RNTI, or P-RNTI or TC-RNTI, or C-RNTI, or MCS-C-RNTI, or CS-RNTI, or PDSCHs with SPS, the UE assumes if the PDSCH resource allocation overlaps with REs containing idle mode CSI-RS/TRS resources the UE may assume that the REs are not available for PDSCH in the OFDM symbols where idle mode CSI-RS/TRS is transmitted.

A third downlink physical layer channel reception impacted by idle mode CSI-RS/TRS can be PDCCH. For one example, if the UE has not received the configuration of idle mode CSI-RS/TRS (e.g., a UE monitors the PDCCH candidate for a Type0-PDCCH CSS set) on the cell, the UE may assume that no idle mode CSI-RS/TRS is transmitted in the REs used for monitoring the PDCCH candidate. For another example, if the UE has received the configuration of idle mode CSI-RS/TRS (e.g., a UE monitors the PDCCH candidate other than for a Type0-PDCCH CSS set) on the cell, and at least one RE for a PDCCH candidate overlaps with at least one RE corresponding to the configured idle mode CSI-RS/TRS, the UE is not required to monitor the PDCCH candidate.

In one embodiment, a UE behavior for idle mode CSI-RS/TRS reception is provided in case of collision with other physical layer signal/channel, such that configured RE of the idle mode CSI-RS/TRS overlaps with configured RE of a physical layer signal/channel.

In one example for idle mode CSI-RS/TRS reception in case of collision with other physical layer signal/channel, a UE performs rate matching for the idle CSI-RS/TRS reception, where the UE expects that an idle mode CSI-RS/TRS resource is rate matched such that the UE avoids REs occupied any of the following physical layer signal/channel: (1) an SSS; (2) a primary synchronization signal (PSS); and/or (3) a SS/PBCH block.

In one example for idle CSI-RS/TRS reception in case of collision with other physical layer signal/channel, a UE does not expect to receive an idle mode CSI-RS/TRS resource when any configured RE or OFDM symbol of the idle mode CSI-RS/TRS resource overlaps with any RE or OFDM symbol of any of the following physical layer signal/channel: (1) an SS/PBCH block; (2) a measurement gap, wherein the UE is configured to perform RRM measurements in the measurement gap; (3) a PDCCH candidate, wherein the UE is configured to monitor a DCI format with CRC scrambled by P-RNTI or SI-RNTI or RA-RNTI; and/or (4) a PDSCH.

In one example for idle CSI-RS/TRS reception in case of collision with other physical layer signal/channel, a UE may assume that no any of the following physical layer signal/channel is transmitted in the configured REs used for idle mode CSI-RS/TRS reception: (1) an SS/PBCH block; (2) a measurement gap, wherein the UE is configured to perform RRM measurements in the measurement gap; (3) a PDCCH candidate, wherein the UE is configured to monitor a DCI format with CRC scrambled by P-RNTI or SI-RNTI or RA-RNTI; and/or (4) a PDSCH.

In one embodiment, a sequence generation of idle mode CSI-RS/TRS is provided. The UE may assume the reference-signal sequence $r(m)$ is defined by:

$$r(m) = \frac{1}{\sqrt{2}}(1 - 2 \cdot c(2m)) + j\frac{1}{\sqrt{2}}(1 - 2 \cdot c(2m+1))$$

where the pseudo-random sequence c(m) is defined in standard specification.

In one example for initialization of pseudo-random sequence generator, the pseudo-random sequence generator may be initialized with $c_{init}=(2^{10}(N_{symb}^{slot}n_{s,f}^{\mu}+l+1)(2n_{ID}+1)+n_{ID})$ mod $2^{31}$ at the start of each OFDM symbol where $n_{s,f}^{\mu}$ is the slot number within a radio frame, l is the OFDM symbol number within a slot.

For determination of $n_{ID}$, at least one of the following methods can be provided. In one example, $n_{ID}$ is provided by higher layers, e.g., scramblingID. For example, $n_{ID}$ included in RMSI. In another example, $n_{ID}$ equals to cell ID of the cell. In yet another example, $n_{ID}$ can be determined by a UE ID, $I^{UE}$, which is used for determining paging occasion, such that $I^{UE}$,=5G-S-TMSI mod 1024. For example, $$n_{ID} = \mathrm{mod}\left(\left\lfloor\frac{I^{UE}}{c1}\right\rfloor, c2\right),$$

where c1 and c2 are integers and can be either defined in the specification of the system operation or provided to the UE through higher layer signaling. In one example, c1 or c2 equals number of total paging frames in a DRX cycle. In another example, c1 or c2 equals to number of paging occasions for a paging frame (PF). In yet another example, values for c1 and c2 are included in RMSI. In yet another example, $n_{ID}$ equals to the SS/PBCH block index, where the UE assumes that the CSI-RS/TRS and the SS/PBCH block are quasi-co-located with respect to Doppler spread, Doppler shift, average gain, average delay, delay spread, and, when applicable, spatial Rx parameters.

In one example initialization of pseudo-random sequence generator, the pseudo-random sequence generator may be initialized with $$c_{init} = 2^{11}(\bar{\iota}_{SSB}+1)\left(\left\lfloor\frac{N_{ID}^{cell}}{4}\right\rfloor+1\right)+2^{6}(\bar{\iota}_{SSB}+1)+\left(N_{ID}^{cell}\mathrm{mod}\,4\right)$$

where: $N_{ID}^{cell}$ is cell ID; for $L_{max}$=4, $\bar{\iota}_{SSB}=i_{SSB}+4n_{hf}$ where $n_{hf}$ is the number of the half-frame in which the PBCH is transmitted in a frame with $n_{hf}$=0 for the first half-frame in the frame and $n_{hf}$=1 for the second half-frame in the frame, and $i_{SSB}$ is the two least significant bits of the SS/PBCH block index as defined in standard specification; and/or for $L_{max}$=8 or $L_{max}$=64, $\bar{\iota}_{SSB}=i_{SSB}$ where $i_{SSB}$ is the three least significant bits of the SS/PBCH block index as defined standard specification, with $L_{max}$ being the maximum number of SS/PBCH beams in an SS/PBCH period for a particular band as given by standard specification.

In one example for initialization of pseudo-random sequence generator, the pseudo-random sequence generator may be initialized with $$c_{init} = 2^{11}(X+1)\left(\left\lfloor\frac{N_{ID}^{cell}}{c1}\right\rfloor+1\right)+2^{6}(X+1)+\left(N_{ID}^{cell}\mathrm{mod}\,c1\right)$$

where $N_{ID}^{cell}$ is cell ID. c1 is an integer and is either defined in the specification of system operation, e.g., c1=4, or provided to a UE through higher layer signalling, for example via RMSI. X can be determined by a UE ID, $I^{UE}$, which is used for determining paging occasion. For example, $$n_{ID} = \mathrm{mod}\left(\left\lfloor\frac{I^{UE}}{c3}\right\rfloor, c2\right),$$

where c3 and c2 are integers, and can be either defined in the specification of the system operation or provided to the UE through higher layer signaling. In one example, c3 or c2 equals number of total paging frames in a DRX cycle. In another example, c3 or c2 equals to number of paging occasions for a paging frame (PF). In yet another example, values for c3 and c2 are included in RMSI.

A UE may base the timing of the CSI-RS/TRS resource on the timing of a cell, wherein the ID of the cell is used for sequence generation of the CSI-RS/TRS resource Therefore, there is a need to support measurement time domain configuration (MTC) for determining valid monitoring occasions or time for a UE to receive CSI-RS/TRS in RRC_IDLE/INACTIVE state or RRC_CONNECTED state.

There is another need to determine UE behavior for CSI-RS/TRS reception based on predetermined MTC.

The disclosure relates to determining MTC for valid monitoring occasions or time for a UE to receive CSI-RS/TRS in RRC_IDLE/INACTIVE state or RRC_CONNECTED state. The disclosure also relates to determining UE behavior for receiving CSI-RS/TRS based on predetermined MTC.

This present disclosure provides CSI-RS/TRS transmitted from a cell to UEs operate in RRC_INACTIVE/IDLE state or RRC_CONNECTED state. The cell can be a serving cell or a neighboring cell wherein the UE performs RRM measurement for the neighboring cell. The CSI-RS/TRS can be used by the UE in RRC_IDLE/INACTIVE state or RRC_CONNECTED state for at least one of time/frequency tracking or CSI computation or L1-RSRP computation or RRM measurement. The CSI-RS/TRS transmitted to a UE in RRC_IDLE/INACTIVE state is referred as idle mode CSI-RS/TRS, and the CSI-RS/TRS transmitted to a UE in RRC_CONNECTED state is referred as connected mode CSI-RS/TRS in this present disclosure.

In one embodiment, a measurement MTC is provided for determining the valid monitoring occasions or time for a UE to receive CSI-RS/TRS in RRC_IDLE/INACTIVE state or RRC_CONNECTED state, and the MTC associated with CSI-RS/TRS reception is referred as MTC in this disclosure.

At least one MTC can be provided to the UE to be associated with CSI-RS/TRS reception, e.g., either idle mode CSI-RS/TRS or connected mode CSI-RS/TRS, from M>=1 cells.

In one example for determining M, M can be defined in the system operation, e.g., M=1. In one example of M=1, the UE can be provided with a MTC for receiving CSI-RS/TRS from a serving cell in RRC_IDLE/INACTIVE state or RRC_IDLE/INACTIVE state.

In another example for determining M, M is provided to the UE by higher layers. For example, a UE can be provided with a MTC for idle mode CSI-RS/TRS reception associated with M>=1 cells, and the idle mode CSI-RS/TRS are used for RRM measurement from the associated M cells.

A UE can provide any of the following approaches for receiving a MTC from a serving cell.

In one example, the UE receives the MTC as part of system information. The UE receives the MTC in a PDSCH that is scheduled by a DCI format with CRC scrambled by SI-RNTI. For one example, the MTC is included in RMSI. For another example, the configuration is included in OSI.

In another example, the UE can receive the MTC or part of the MTC when the UE is triggered to switch from RRC_CONNECTED state to RRC_IDLE/INACTIVE state. The MTC can be provided by higher layer, for example SuspendConfig in RRCRelease.

In yet another example, the UE can receive the MTC from a PBCH. For example, the configuration is included in MIB.

In yet another example, the UE can receive the MTC from a PDSCH that is scheduled by a DCI format with CRC scrambled by RA-RNTI or TC-RNTI. For example, the MTC can be included in msg 2 or msg 4 during RACH procedure.

In yet another example, the MTC can be provided per UE group, where a UE group ID, $n_{UE\_group}$, is associated with a UE ID, $I^{UE}$, which is used for determining paging occasion, such that $I^{UE}$=5G-S-TMSI mod 1024. For example, $$n_{UE\_group} = \mod\left(\left\lfloor \frac{I^{UE}}{c1} \right\rfloor, c2\right),$$

where c1 and c2 are integers, and can be either defined in the specification of the system operation or provided to the UE through higher layer signaling. In one example, c1 or c2 equals number of total paging frames in a DRX cycle. In another example, c1 or c2 equals to number of paging occasions for a paging frame (PF). In yet another example, values for c1 and c2 are included in RMSI.

In yet another example, the MTC can be provided in a dedicated RRC parameter, if the MTC is for reception of CSI-RS/TRS in connected state. In yet another example, the MTC can be provided to UE by a DCI format in PDCCH received in a PO with CRC scrambled by P-RNTI. In yet another example, the MTC can be provided to UE by a DCI format that includes an indication to indicate whether or not to receive a PO.

In one example for determining MTC for CSI-RS/TRS reception, a UE can be provided with a MTC associated with a PO. The MTC is referred as first type of MTC in this disclosure.

Figure 10:
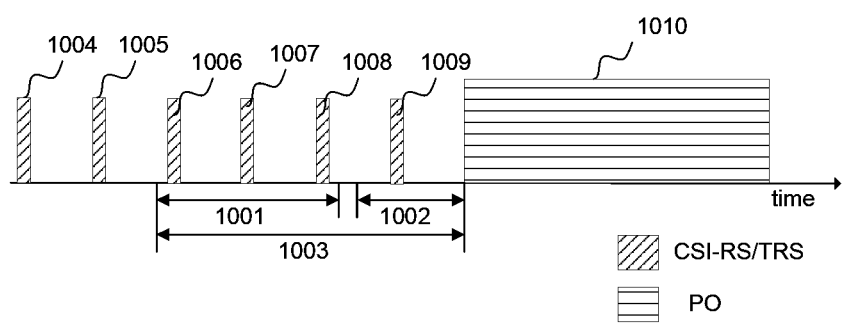
FIG. 10 illustrates an example of a first type of MTC according to embodiments of the present disclosure.

FIG. 10 illustrates an example of a first type of MTC 1000 according to embodiments of the present disclosure. An embodiment of the first type of MTC 1000 shown in FIG. 10 is for illustration only.

In one example of first type of MTC, a MTC includes a time offset indicating a time, in unit of one millisecond, or a number of slots, or a number of symbols, prior to the start of a PO, denoted as MTC1_offset1, 1003 in FIG. 10. For a UE monitoring the PO, the UE does not expect to receive a CSI-RS/TRS resource, where the time offset between the start of the CSI-RS/TRS resource and the start of the PO is larger than MTC1_offset1, i.e., 1004, 1005 in FIG. 10. MTC1_offset1 can be either provided to the UE in the MTC or reported by the UE as a UE capability or assistance information.

In another example of first type of MTC, a MTC includes a time offset indicating a time, in unit of one millisecond, or a number of slots, or a number of symbols, prior to the start of a PO, denoted as MTC1_offset2, 1002 in FIG. 10. For a UE monitoring the PO, the UE does not expect to receive a CSI-RS/TRS resource, where the time offset between the start of the CSI-RS/TRS resource and the start of the PO is smaller than MTC1_offset2, i.e., 1009 in FIG. 10. MTC1_offset2 can be either provided to the UE in the MTC or reported by the UE as a UE capability or assistance information.

In another example of first type of MTC, a MTC includes a duration indicating a time period or a number of slots or a number of symbols, denoted as $N_{duration}^{MTC}$ For a UE receives the configuration of the MTC, the UE expect to receive a CSI-RS/TRS resource within a time period with duration of $N_{duration}^{MTC}$ starting from a reference point and does not expect to receive a CSI-RS/TRS resource outside the time period, in 1001 in FIG. 10. The reference point can be a time point, which is X slots or milliseconds prior to the start of a PO. $N_{duration}^{MTC}$ or X can be either provided to the UE in the MTC or reported by the UE as a UE capability or assistance information. Alternatively, the reference point can be the time when UE receives the configuration of MTC. The UE assumes the MTC expires after the time duration, $N_{duration}^{MTC}$, from the last slot or symbol when the UE receives the indication of MTC.

In one example for determining MTC for CSI-RS/TRS reception, a UE can be provided with a MTC that includes a measurement window with a periodicity, denoted as $T^{MTC}$, a duration, denoted as $D^{MTC}$, and an offset, denoted as $O^{MTC}$. The MTC is referred as second type of MTC in this disclosure. $T^{MTC}$ or $D^{MTC}$ or $O^{MTC}$ can be in the unit of one slot or one millisecond or one symbol.

In one example for determining any of $T^{MTC}/D^{MTC}/O^{MTC}$, any of $T^{MTC}/D^{MTC}/O^{MTC}$ can be either provided to a UE in the MTC.

In another example for determining any of $T_{MTC}/D^{MTC}/O^{MTC}$ any of $T^{MTC}/D^{MTC}/O^{MTC}$ is defined in the specification of the system operation. For example, $T^{MTC}$ equals to the DRX cycle used by a UE in RRC_IDLE/INACTIVE state. For another example, $T^{MTC}$ equals to the DRX cycle used by a UE in RRC_CONNECTED state.

In yet example for determining any of $T^{MTC}/D^{MTC}/O^{MTC}$, any of $T^{MTC}/D^{MTC}/O^{MTC}$ can be reported by a UE as a UE capability or assistance information.

Figure 11:
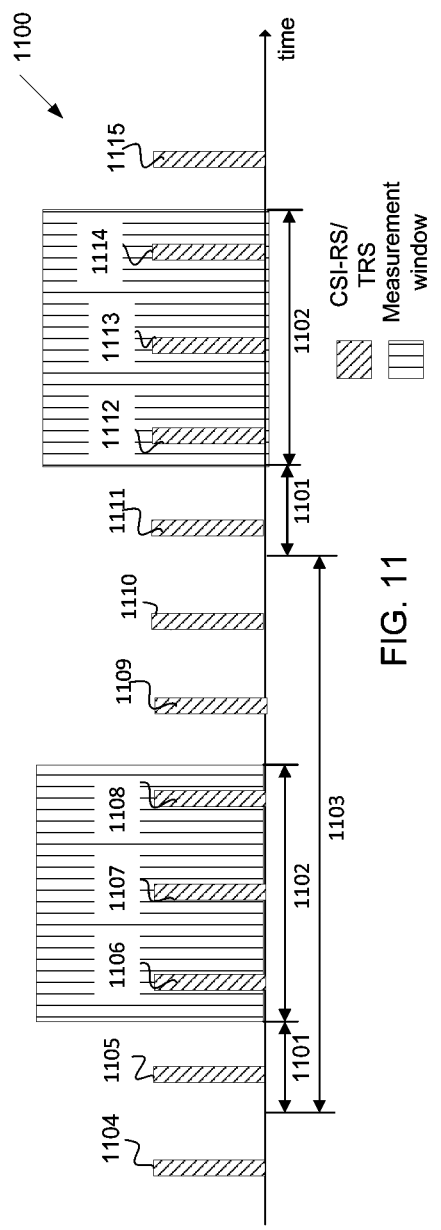
FIG. 11 illustrates an example of a second type of MTC according to embodiments of the present disclosure.

FIG. 11 illustrates an example of a second type of MTC 1100 according to embodiments of the present disclosure. An embodiment of the second type of MTC 1100 shown in FIG. 11 is for illustration only.

For a UE receives a second type of MTC, the UE determines a time period for associated CSI-RS/TRS reception based on MTC, wherein the UE expects to receive CSI-RS/TRS from associated cell(s) within the time period. The UE does not expect to receive CSI-RS/TRS from associated cell(s) outside of the time period, 1102 in FIG. 11. The UE can determine the time period of $D^{MTC}$ consecutive slots starting from a slot with number $n_{i,f}^{\mu}$ in a frame with number $n_f$. The UE can determine $n_{i,f}^{\mu}$, and $n_f$ such that $(n_f N_{slot}^{frame,\mu}+n_{i,f}^{\mu}-O^{MTC}) \mod T^{MTC}=0$, where $N_{slot}^{frame,\mu}$ is number of slots per frame with SCS configuration of and µ is the SCS configuration of the CSI-RS/TRS.

In one example for determining MTC for CSI-RS/TRS reception, a UE can be provided with a MTC associated with an ON duration when a UE is configured with DRX in RRC_CONNECTED state. The ON duration is indicated by a drx-onDurationTimer of the DRX. The MTC is referred as third type of MTC in this disclosure.

Figure 12:
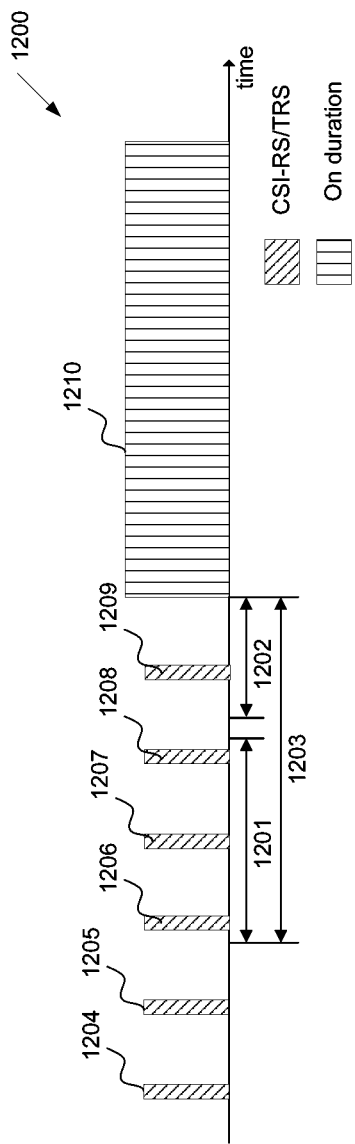
FIG. 12 illustrates an example of a third type of MTC according to embodiments of the present disclosure.

FIG. 12 illustrates an example of a third type of MTC 1200 according to embodiments of the present disclosure.

An embodiment of the third type of MTC 1200 shown in FIG. 12 is for illustration only.

In one example of third type of MTC, a MTC includes a time offset indicating a time, in unit of one millisecond, or a number of slots, or a number of symbols prior to the start of an ON duration of a DRX cycle, denoted as MTC3_offset1, 1203 in FIG. 12. The DRX cycle can be either a long DRX cycle or a short DRX cycle. For a UE monitoring PDCCH in the ON duration, the UE does not expect to receive a CSI-RS/TRS resource, where the time offset between the start of the CSI-RS/TRS resource and the start of the ON duration is larger than MTC_offset1, i.e., 1204, 1205 in FIG. 12. MTC3_offset1 can be either provided to a UE in the MTC or reported by the UE as a UE capability or assistance information.

In another example of third type of MTC, a MTC includes a time offset indicating a time, in unit of one millisecond, or a number of slots, or a number of symbols prior to the start of an ON duration of a DRX cycle, denoted as MTC3_offset2, 1202 in FIG. 12. The DRX cycle can be either a long DRX cycle or a short DRX cycle. For a UE monitoring PDCCH in the ON duration, the UE does not expect to receive a CSI-RS/TRS resource, where the time offset between the start of the CSI-RS/TRS resource and the start of the ON duration is smaller than MTC3_offset2, i.e., 1209 in FIG. 12. MTC3_offset2 can be either provided to a UE in the MTC or reported by a UE as a UE capability or assistance information.

In another example of third type of MTC, a MTC includes a duration indicating a time period or a number of slots or a number of symbols, denoted as $N_{duration}^{MTC}$. For a UE receives the configuration of the MTC, the UE expect to receive a CSI-RS/TRS resource within a time period with duration of $N_{duration}^{MTC}$ starting from a reference point and does not expect to receive a CSI-RS/TRS resource outside the time period, in 1201 in FIG. 12. The reference point can be a time point, which is X slots or milliseconds prior to the start of an ON duration associated with a DRX cycle. The DRX cycle can be either a long DRX cycle or a short DRX cycle. $N_{duration}^{MTC}$ or X can be either provided to a UE in the MTC or reported by the UE as a UE capability or assistance information.

In one embodiment, a UE behavior for CSI-RS/TRS reception is provided in RRC_IDLE/INACTIVE state or RRC_CONNECTED state based on at least one MTC associated with M>=1 cells.

In one example for receiving idle mode CSI-RS/TRS based on MTC, a MTC for idle mode CSI-RS/TRS reception from associated M>=1 cell(s) is provided to a UE when the UE is in RRC_CONNECTED state. For example, the MTC can be provided to the UE when the UE receives a configuration for the idle mode CSI-RS/TRS resources.

An MTC can be semi-persistent, such that a UE can be provided with an indication from higher layers to activate or deactivate the MTC. The UE does not expect to receive idle mode CSI-RS/TRS from a cell that is associated with a deactivated MTC.

Figure 13:
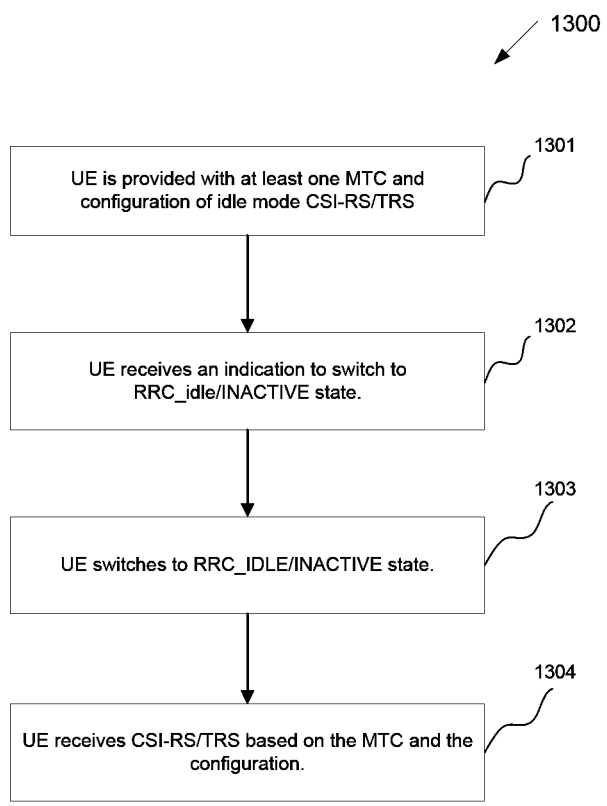
FIG. 13 illustrates a flowchart of a method of UE for receiving idle mode CSI-RS/TRS according to embodiments of the present disclosure.

FIG. 13 illustrates a flowchart of a method 1300 of UE for receiving idle mode CSI-RS/TRS according to embodiments of the present disclosure. For example, the method 1300 may be implemented by a UE, such as UE 116 in FIG. 1 An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, a UE is provided with at least one MTC and configuration of idle mode CSI-RS/TRS from a serving cell for receiving idle mode CSI-RS/TRS from M>=1 cells, at step 1301. For example, the MTC and configuration of idle mode CSI-RS/TRS can be received via RMSI or OSI during RRC_CONNECTED state. The UE receives an indication to switch from RRC_CONNECTED state to RRC_IDLE/INACTIVE state, at step 1302. The UE switches to RRC_IDLE/INACTIVE state, at step 1303. The UE then expects to receive CSI-RS/TRS resources based on the configuration of idle mode CSI-RS/TRS from associated cell(s) during a time period, where the associated cell(s) and the time period are determined by the MTC, at step 1304.

In one example for receiving idle mode CSI-RS/TRS based on MTC, a new or updated MTC for idle mode CSI-RS/TRS reception from associated M>=1 cell(s) can be provided to a UE during RRC_IDLE/INACTIVE state. When a UE receives an updated MTC during RRC_IDLE/INACTIVE state, the UE use the new or updated MTC to override the MTC the UE received before if any. The new or updated MTC can be provided to the UE through any of the approaches defined in the first embodiment of this disclosure.

Figure 14:
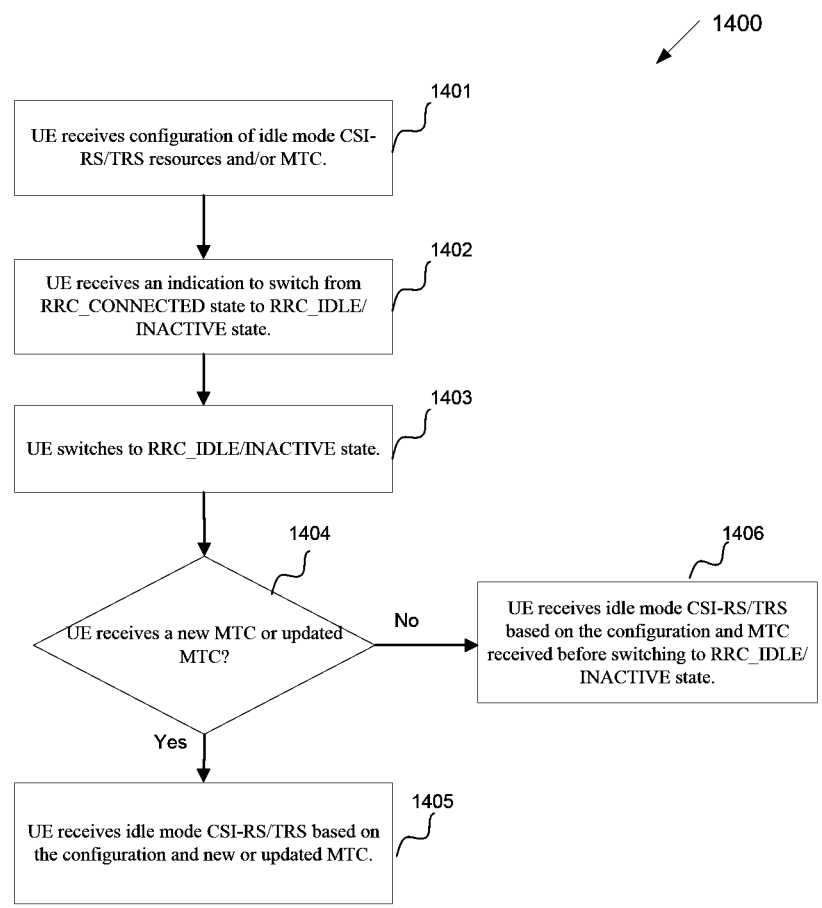
FIG. 14 illustrates another flowchart of a method of UE for receiving idle mode CSI-RS/TRS according to embodiments of the present disclosure.

FIG. 14 illustrates another flowchart of a method 1400 of UE for receiving idle mode CSI-RS/TRS according to embodiments of the present disclosure. For example, the method 1400 may be implemented by a UE, such as UE 116 in FIG. 1 An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, a UE receives configuration for idle mode CSI-RS/TRS and/or MTC for determining the time duration for receiving the CSI-RS/TRS resources during RRC_IDLE/INACTIVE state, at step 1401. For example, the configuration and/or MTC can be received via RMSI or OSI during RRC_CONNECTED state. During RRC_CONNECTED state, the UE receives an indication to switch from RRC_CONNECTED state to RRC_IDLE/INACTIVE state, at step 1402. The UE switches to RRC_IDLE/INACTIVE state, at step 1403. The UE determines whether or not the UE receives a new MTC or an updated MTC, at step 1404. If the UE receives a new MTC or an updated MTC, the UE overrides MTC the UE received before if any, at step 1405. The UE expects to receive idle mode CSI-RS/TRS from associated cell(s) during time duration, where the associated cell(s) and the time duration are determined by the new MTC or updated MTC. Otherwise, the UE expects to receive idle CSI-RS/TRS from associated cell(s) during time during, where the associated cell(s) and time duration are determined by MTC received before switching to RRC_IDLE/INACTIVE state, at step 1406.

In one example for receiving either idle mode CSI-RS/TRS or connected mode CSI-RS/TRS based on MTC, a UE can be provided with an indication to activate or deactivate one or more MTC. The UE does not expect to receive CSI-RS/TRS with configuration associated with a MTC that is deactivated. A UE can receive the indication for activating or deactivating MTC through a physical layer signal/channel during RRC_CONNECTED state or RRC_IDLE/INACTIVE state. In one example, the indication can be a binary bit to indicate activation or deactivation of all MTCs. In another example, the indication can be a bitmap, where each bit in the bitmap indicates activation or deactivation of an MTC. In yet another example, the indication can be IDs of activated or deactivated MTCs.

For determining the physical layer signal/channel to receive the indication, at least one of the following can be provided by a UE. In one example, the indication is included in a PSS, e.g., the initial condition of the sequence, and/or mapping order of the sequence. In another example, the indication is included in a SSS, e.g., the initial condition of the sequence, and/or mapping order of the sequence. In yet another example, the indication is included in a DM-RS of PBCH, e.g., the initial condition of the sequence, and/or mapping order of the sequence, and/or REs mapped for the sequence. In yet another example, the indication is included in the payload of PBCH, e.g., MIB. In yet another example, the indication is included in the short message of paging PDCCH. In yet another example, the indication is included in a paging DCI format, wherein a UE receives the DCI format with CRC scrambled by P-RNTI. In yet another example, the indication is included in idle mode CSI-RS/TRS, e.g., the initial condition of the sequence and/or mapping order of the CSI-RS/TRS, and/or REs mapped for the sequence. In yet another example, the indication can be included in a DCI format. For example, a DCI format with CRC scrambled by power saving RNTI (PS-RNTI). For another example, a DCI format monitored by a UE in common search space.

In one example of applying the indication for activating or deactivating one or more MTC. When a UE receives an indication for activating or deactivating one or more MTC at slot n, the UE can apply the indication starting from slot n', where n' is the first slot with a time delay of at least D0 after slot n.

In another example of applying the indication for activating or deactivating one or more MTC. When a UE receives an indication for activating or deactivating one or more MTC at time, T0, the UE can apply the indication at time, T1, with a time delay of D0 after time T0. T0 or T1 can be either slot index or OFDM symbol index.

D0 can be in the unit of one OFDM symbol, or one millisecond, or one slot. In one example for determining T0, T0 is be provided by higher layers. In another example for determining T0, T0 can be in the MTC, and be provided to the UE through any approaches defined in the first embodiment of this disclosure. In yet another example for determining T0, T0 is be reported by the UE based as UE capability or assistance information.

Figure 15:
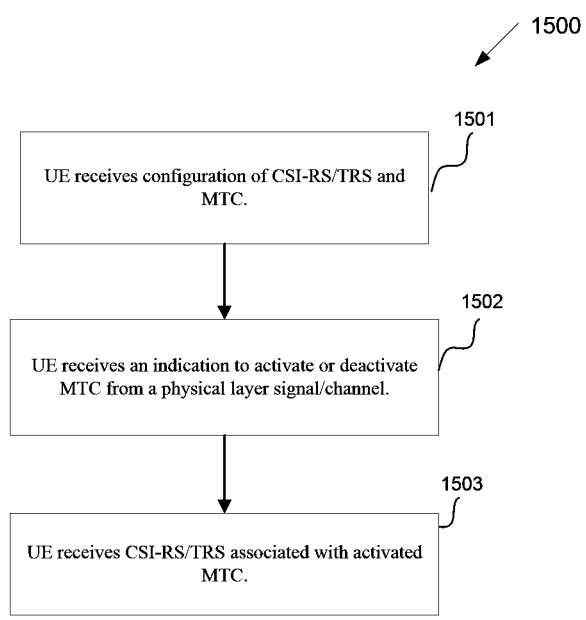
FIG. 15 illustrates yet another flowchart of a method of UE for receiving idle mode CSI-RS/TRS according to embodiments of the present disclosure.

FIG. 15 illustrates yet another flowchart of a method 1500 of UE for receiving idle mode CSI-RS/TRS according to embodiments of the present disclosure. For example, the method 1500 may be implemented by a UE, such as UE 116 in FIG. 1 An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, a UE receives configuration for CSI-RS/TRS and MTC for determining the time duration for receiving the CSI-RS/TRS resources during RRC_IDLE/INACTIVE state or RRC_CONNECTED state, at step 1501. For example, the configuration and MTC can be received via RMSI or OSI during RRC_CONNECTED state. A UE receives an indication to activate or deactivate MTC from a physical layer signal/channel in a serving cell, at step 1502. The UE expects to receive CSI-RS/TRS based on the configuration of CSI-RS/TRS, from associated cell(s) during time duration, where the associated cell(s) and time duration are determined by activated MTC, at step 1503. The UE does not expect to receive any CSI-RS/TRS associated with deactivated MTC.

In one embodiment, on one frequency layer, a UE can be configured with multiple MTCs for CSI-RS/TRS reception. For example, at least one MTC is configured for intra-frequency measurement, and at least one MTC is configured for inter-frequency measurement. For another example, at least one MTC is configured for serving cell measurement, and at least one MTC is configured for neighboring cell measurement.

In one embodiment, on one frequency layer, if a UE is configured with both SMTC and MTC for CSI-RS/TRS reception, the UE performs SSB-based RRM measurement and CSI-RS based RRM measurement if the corresponding RS is located within both the SMTC and MTC for CSI-RS/TRS reception.

Unlike LTE, there is no cell-specific reference signal (CRS) in every subframe for NR system. Due to the distributive bursts of SS/PBCH blocks as illustrated in FIG. 6B, a UE may need to wake up many times to collect multiple L1 RSRP or RSRQ samples for RRM measurement. In addition to RSRP or RSRQ measurement, a UE also rely on SS/PBCH block for time or frequency domain synchronization and running all necessary loops (e.g., AGC, TTL and FTL) after wake-up from a sleep mode. A UE has to at least keep light sleep during the time gap between SSBs and the time gap between the closest SSB to an PO.

In NR Rel-17, TRS/CSI-RS occasion(s) available in connected mode are provided to idle/inactive-mode UEs. A UE can perform RRM measurement, synchronization, or loop convergence based on TRS/CSI-RS other than SS/PBCH blocks to reduce wake-up time for power saving benefit, and thus extend battery lifetime.

However, always-on RS requires large channel overhead and thus is unacceptable to NW. Therefore, there is a need to provide a flexibility for NW to skip transmitting TRS/CSI-RS resources in RRC_IDLE/INACTIVE state as needed. To reduce signaling overhead, validation of TRS/CSI-RS reception based on reception of other DL signals can be provided.

There is another need to validate TRS/CSI-RS reception by aligning the reception occasion of TRS/CSI-RS close to the reception occasion of SS/PBCH blocks in order to avoid multiple wake-ups of UE.

There is yet another need to validate TRS/CSI-RS reception by aligning the reception occasion of TRS/CSI-RS close to reception occasion of paging PDCCH in order to avoid multiple wake-ups of UE.

There is yet another need to validate TRS/CSI-RS reception by aligning the reception occasion of TRS/CSI-RS close to SMTC window in order to avoid multiple wake-ups of UE.

There is yet another need to validate TRS/CSI-RS reception by aligning the reception occasion of TRS/CSI-RS close to PO in order to avoid multiple wake-ups of UE.

There is yet another need to validate TRS/CSI-RS reception by aligning the reception occasion of TRS/CSI-RS close to reception occasion of wake-up signal in idle mode in order to avoid multiple wake-ups of UE.

There is yet another need to validate TRS/CSI-RS reception by aligning the reception occasion of TRS/CSI-RS close to reception occasion of paging PDSCH in order to avoid multiple wake-ups of UE.

In one embodiment, validation of TRS/CSI-RS reception based on detection of a SS/PBCH block in a reception occasion is provided. A reception occasion of a SS/PBCH block can be the slot or symbols where a UE receives the SS/PBCH block. The UE determines whether or not to receive TRS/CSI-RS in configured set of symbols according to a validation approach based on detection of SS/PBCH block.

Figure 16:
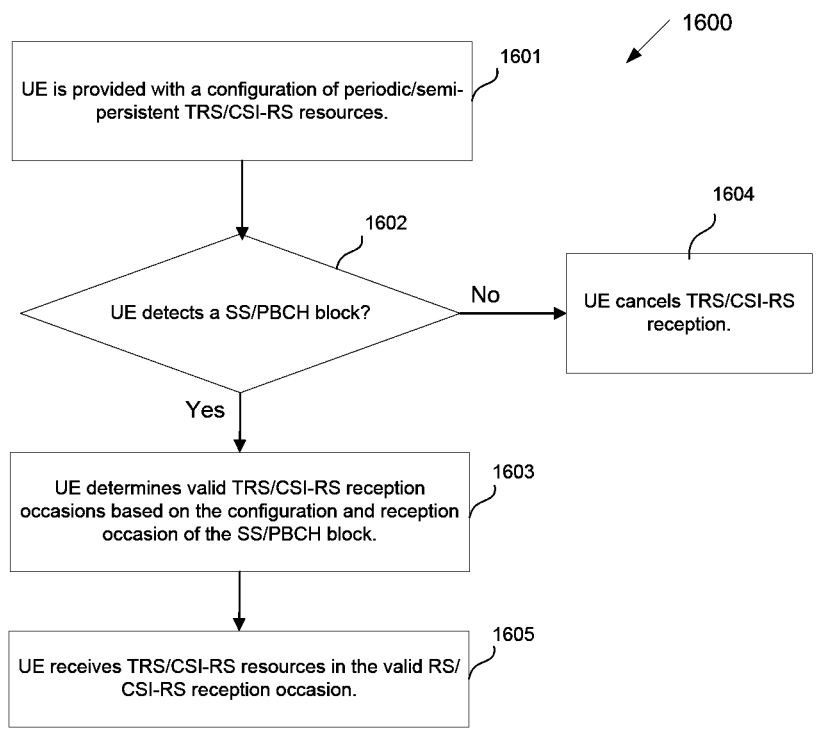
FIG. 16 illustrates a flowchart of a method of UE for validation of TRS/CSI-RS reception according to embodiments of the present disclosure.

FIG. 16 illustrates a flowchart of a method 1600 of UE for validation of TRS/CSI-RS reception based on detection of SS/PBCH block in RRC_IDLE/INACTIVE state according to embodiments of the present disclosure. For example, the method 1600 may be implemented by a UE, such as UE 116 in FIG. 1 An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated, a UE can be provided with a configuration of periodic/semi-persistent TRS/CSI-RS resources from a serving cell in RRC_IDLE/INACTIVE state, at step 1601. The UE determines whether or not the UE detects a SS/PBCH block, at step 1602. If the UE detects a SS/PBCH block, the UE then determines valid TRS/CSI-RS reception occasion according to the configuration and reception occasion of the SS/PBCH block, at step 1603; otherwise, the UE assume there is no valid TRS/CSI-RS reception occasion and a UE cancels the TRS/CSI-RS reception, at step 1604. The UE receives TRS/CSI-RS resources in the valid TRS/CSI-RS reception occasion, at step 1605.

In one example, validating TRS/CSI-RS reception based on detection of SS/PBCH block in a reception occasion is provide. For validating a set of symbols configured to receive TRS/CSI-RS, a UE receives TRS/CSI-RS in one or more symbols from the set of symbols if the one or more symbols are contained in the reception occasion of the SS/PBCH block. For invalidating a set of symbols configured to receive TRS/CSI-RS, the UE cancels TRS/CSI-RS reception in one or more symbols from the set of symbols if the one or more symbols are not contained in the reception occasion of the SS/PBCH block.

In one example, validating TRS/CSI-RS reception based on detection of a SS/PBCH block in a reception occasion is provided. For validating a set of symbols configured to receive TRS/CSI-RS, a UE receives TRS/CSI-RS in the set of symbols if one or more symbols from the set of symbols are contained in the reception occasion of the SS/PBCH block. For invalidating a set of symbols configured to receive TRS/CSI-RS, the UE cancels TRS/CSI-RS reception in the set of symbols if no symbol from the set of symbols is contained in the reception occasion of the SS/PBCH block.

In one example, validating TRS/CSI-RS reception based on detection of a SS/PBCH block in a reception occasion is provided. For validating a set of symbols configured to receive TRS/CSI-RS, a UE receives TRS/CSI-RS in a symbol from the set of symbols if the symbol is after the reception occasion of the SS/PBCH block, and the time offset, O1, between the symbol and end of the reception occasion of the SS/PBCH block is less or no larger than O1min. For invalidating a set of symbols configured to receive TRS/CSI-RS, a UE cancels TRS/CSI-RS reception in a symbol from the set of symbols if the symbol is not after the reception occasion of the SS/PBCH block, or the time offset, O1, between the symbol and end of the reception occasion of the SS/PBCH block is no smaller or larger than O1min. The unit of O1 and $O1_{min}$ can be one slot or one millisecond or one symbol.

The minimum time offset, $O1_{min}$, can be determined by a UE through any of the following methods: (1) $O1_{min}$ is predefined in the specification of system operation, e.g., $O1_{min}$=2 slots; (2) $O1_{min}$ is provided to a UE through higher layer signaling; (3) $O1_{min}$ is reported by a UE to a gNB as one of UE capabilities.

In one example, validating TRS/CSI-RS reception based on detection of a SS/PBCH block in a reception occasion is provided. For validating a set of symbols configured to receive TRS/CSI-RS, a UE receives TRS/CSI-RS in a symbol from the set of symbols if the symbol is before the reception occasion of the SS/PBCH block, and the time offset, O2, between the symbol and start of the reception occasion of SS/PBCH block is less or no larger than O2min. For invalidating a set of symbols configured to receive TRS/CSI-RS, a UE cancels TRS/CSI-RS reception in a symbol from the set of symbols if the symbol is not before the reception occasion of the SS/PBCH block, or the time offset, O2, between the symbol and start of the reception occasion of the SS/PBCH block is no smaller or larger than O2min. The unit of O2 and $O2_{min}$ can be one slot or one millisecond or one symbol.

The minimum time offset, $O2_{min}$, can be determined by a UE through any of the following methods: (1) $O2_{min}$ is predefined in the specification of system operation, e.g., $O2_{min}$=2 slots; (2) $O2_{min}$ is provided to a UE through higher layer signaling; and (3) $O2_{min}$ is reported by a UE to a gNB as one of UE capabilities.

Figure 17:
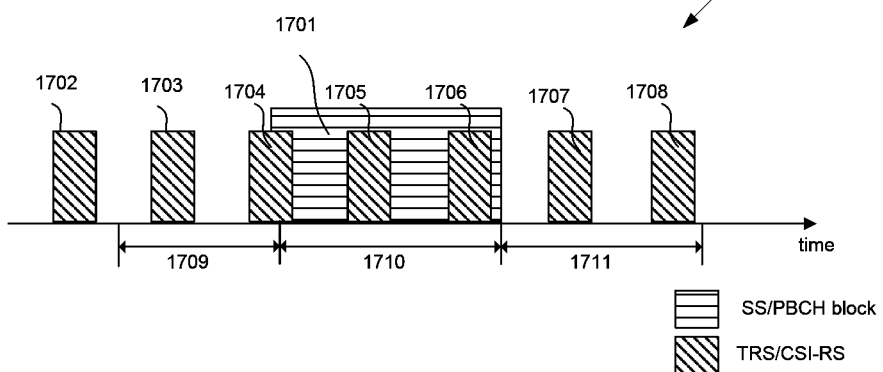
FIG. 17 illustrates an example of TRS/CSI-RS validation according to embodiments of the present disclosure.

FIG. 17 illustrates an example of TRS/CSI-RS validation 1700 based on a detection of SS/PBCH block according to embodiments of the present disclosure. An embodiment of the TRS/CSI-RS validation 1700 shown in FIG. 17 is for illustration only.

As illustrated in FIG. 17, a UE detects SS/PBCH block, 1701. The UE is provided with periodic/semi-persistent TRS/CSI-RS with configured sets of symbols, 1702-1708, to receive TRS/CSI-RS.

According to the first approach for validating TRS/CSI-RS reception based on detection of a SS/PBCH block, the UE receives TRS/CSI-RS in symbols from the configured sets of symbols that are within the reception occasion of the SS/PBCH block, i.e., symbols from 1704, 1705, and 1706 that are within the reception occasion of the SS/PBCH block, 1710.

According to the second approach for validating TRS/CSI-RS reception based on detection of a SS/PBCH block, the UE receives TRS/CSI-RS in the configured sets of symbols that overlaps with the reception occasion of the SS/PBCH block, i.e., 1704, 1705, and 1706.

According to the third approach for validating TRS/CSI-RS reception based on detection of a SS/PBCH block, the UE receives TRS/CSI-RS in the configured sets of symbols, 1707, 1708 that are less than O1min slots, 1711, after the end of the reception occasion of the SS/PBCH block.

According to the fourth approach for validating TRS/CSI-RS reception based on detection of a SS/PBCH block, the UE receives TRS/CSI-RS in the symbols from the configured sets of symbols, 1703, 1704, that are less than O2min slots, 1709, before the start of the reception occasion of the SS/PBCH block.

In one example for receiving TRS/CSI-RS with validation based on detection of a SS/PBCH block, the UE provides that the TRS/CSI-RS and the SS/PBCH block is quasi co-located (QCLed) with respect to Doppler spread, Doppler shift, average gain, average delay, delay spread, and, when applicable, spatial Rx parameters.

In another example for receiving TRS/CSI-RS with validation based on detection of a SS/PBCH block, the UE provides the TRS/CSI-RS is associated with the SS/PBCH block such that the UE determine the timing of TRS/CSI-RS according to the timing of the SS/PBCH block.

In yet another example for receiving TRS/CSI-RS with validation based on detection of a SS/PBCH block, the UE measures L1-RSRP or L1-RSRQ of the serving cell based on the received TRS/CSI-RS for radio resource management in RRC_IDLE/INACTIVE state.

In one embodiment, validation of TRS/CSI-RS reception based on detection of a PDCCH includes a DCI format with CRC scrambled by paging radio network temporary identifier (P-RNTI). The PDCCH is referred as paging PDCCH in this disclosure for benefit of simplified expression. A reception occasion of a paging PDCCH can be the slot or symbols where UE receives the paging PDCCH. When a UE is provided with a configuration of periodic/semi-persistent TRS/CSI-RS resources, the UE determines whether or not to receive TRS/CSI-RS in configured set of symbols according to a validation approach based detection of a paging PDCCH.

Figure 18:
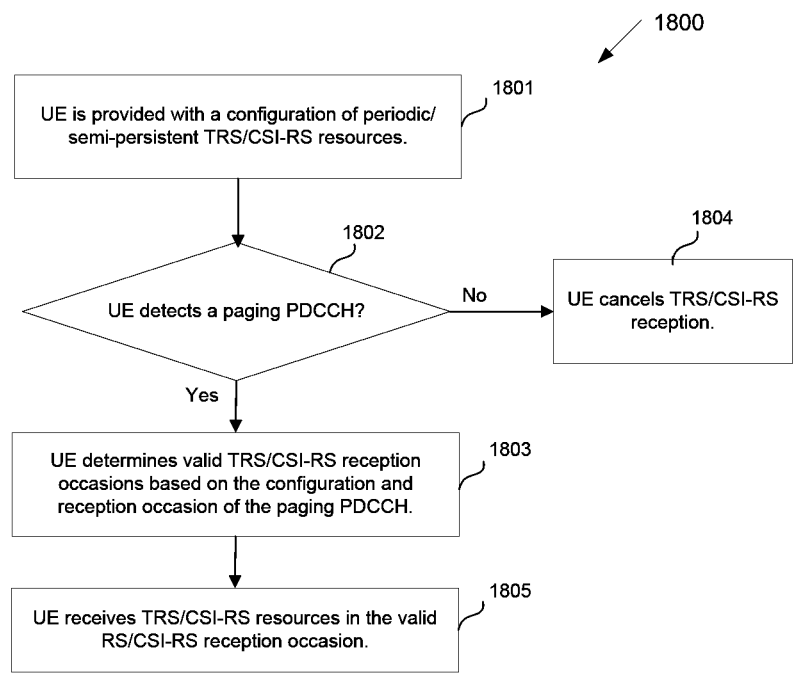
FIG. 18 illustrates another flowchart of a method of UE for validation of TRS/CSI-RS reception according to embodiments of the present disclosure.

FIG. 18 illustrates another flowchart of a method 1800 of UE for validation of TRS/CSI-RS reception based on detection of paging PDCCH in RRC_IDLE/INACTIVE state according to embodiments of the present disclosure. For example, the method 1800 may be implemented by a UE, such as UE 116 in FIG. 1 An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

A UE can be provided with a configuration of periodic/semi-persistent TRS/CSI-RS resources from a serving cell in RRC_IDLE/INACTIVE state, at step 1801. The UE determines whether or not the UE detects a paging PDCCH from the serving cell, at step 1802. If the UE detects a paging PDCCH from the serving cell, the UE then determines valid TRS/CSI-RS reception occasion according to the configuration and reception occasion of the paging PDCCH, at step 1803; otherwise, the UE assume there is no valid TRS/CSI-RS reception occasion and the UE cancels the TRS/CSI-RS reception at step 1804. The UE receives TRS/CSI-RS resources in the valid TRS/CSI-RS reception occasion, at step 1805.

In one example, validating TRS/CSI-RS reception based on detection of a paging PDCCH in a reception occasion is provided. For validating a set of symbols configured to receive TRS/CSI-RS, a UE receives TRS/CSI-RS in one or more symbols from the set of symbols if the one or more symbols are contained in the reception occasion of the paging PDCCH. For invalidating a set of symbols configured to receive TRS/CSI-RS, the UE cancels TRS/CSI-RS reception in one or more symbols from the set of symbols if the one or more symbols are not contained in the reception occasion of the paging PDCCH.

In one example, validating TRS/CSI-RS reception based on detection of a paging PDCCH in a reception occasion is provided. For validating a set of symbols configured to receive TRS/CSI-RS, a UE receives TRS/CSI-RS in the set of symbols if one or more symbols from the set of symbols are contained in the reception occasion of the paging PDCCH. For invalidating a set of symbols configured to receive TRS/CSI-RS, the UE cancels TRS/CSI-RS reception in the set of symbols if no symbol from the set of symbols is contained in the reception occasion of the paging PDCCH.

In one example, validating TRS/CSI-RS reception based on detection of a paging PDCCH in a reception occasion is provided. For validating a set of symbols configured to receive TRS/CSI-RS, a UE receives TRS/CSI-RS in a symbol from the set of symbols if the symbol is after the reception occasion of the paging PDCCH, and the time offset, O1, between the symbol and end of the reception occasion of the paging PDCCH is less or no larger than O1min. For invalidating a set of symbols configured to receive TRS/CSI-RS, a UE cancels TRS/CSI-RS reception in a symbol from the set of symbols if the symbol is not after the reception occasion of the paging PDCCH, or the time offset, O1, between the symbol and end of the reception occasion of the paging PDCCH is no smaller or larger than O1min. The unit of O1 and $O1_{min}$ can be one slot or one millisecond or one symbol.

The minimum time offset, $O1_{min}$, can be determined by a UE through any of the following methods: (1) $O1_{min}$ is predefined in the specification of system operation, e.g., $O1_{min}$=2 slots; (2) $O1_{min}$ is provided to the UE through higher layer signaling; and/or (3) $O1_{min}$ is reported by a UE to a gNB as one of UE capabilities.

In one example, validating TRS/CSI-RS reception based on detection of a paging PDCCH in a reception occasion is provided. For validating a set of symbols configured to receive TRS/CSI-RS, a UE receives TRS/CSI-RS in a symbol from the set of symbols if the symbol is before the reception occasion of the paging PDCCH, and the time offset, O2, between the symbol and start of the reception occasion of paging PDCCH is less or no larger than O2min. For invalidating a set of symbols configured to receive TRS/CSI-RS, a UE cancels TRS/CSI-RS reception in a symbol from the set of symbols if the symbol is not before the reception occasion of the paging PDCCH, or the time offset, O2, between the symbol and start of the reception occasion of the paging PDCCH is no smaller or larger than O2min. The unit of O2 and $O2_{min}$ can be one slot or one millisecond or one symbol.

The minimum time offset, $O2_{min}$, can be determined by a UE through any of the following methods: (1) $O2_{min}$ is predefined in the specification of system operation, e.g., $O2_{min}$=2 slots; (2) $O2_{min}$ is provided to the UE through higher layer signaling; and/or (3) $O2_{min}$ is reported by a UE to a gNB as one of UE capabilities.

Figure 19:
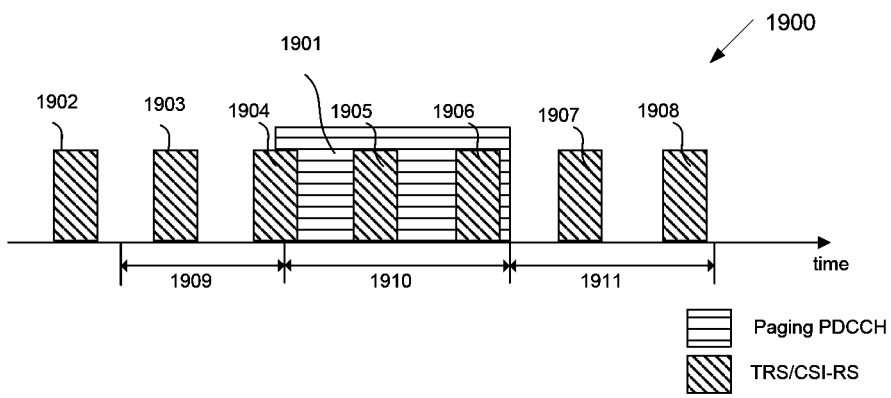
FIG. 19 illustrates another example of TRS/CSI-RS validation according to embodiments of the present disclosure.

FIG. 19 illustrates another example of TRS/CSI-RS validation 1900 based on a detection of paging PDCCH according to embodiments of the present disclosure. An embodiment of the TRS/CSI-RS validation 1900 shown in FIG. 19 is for illustration only.

As illustrated in FIG. 19, a UE detects a paging PDCCH, 1901. The UE is provided with periodic/semi-persistent TRS/CSI-RS with configured sets of symbols, 1902-1908, to receive TRS/CSI-RS.

In one example, for validating TRS/CSI-RS reception based on detection of a paging PDCCH, the UE receives TRS/CSI-RS in symbols from the configured sets of symbols that are within the reception occasion of the paging PDCCH, i.e., symbols from 1904, 1905, and 1906 that are within the reception occasion of the paging PDCCH, 1910.

In one example, for validating TRS/CSI-RS reception based on detection of paging a PDCCH, the UE receives TRS/CSI-RS in the configured sets of symbols that overlaps with the reception occasion of the paging PDCCH, i.e., 1904, 1905, and 1906.

In one example, for validating TRS/CSI-RS reception based on detection of a paging PDCCH, the UE receives TRS/CSI-RS in the configured sets of symbols, 1907, 1908 that are less than O1min slots, 1911, after the end of the reception occasion of the paging PDCCH.

In one example, for validating TRS/CSI-RS reception based on detection of a paging PDCCH, the UE receives TRS/CSI-RS in the symbols from the configured sets of symbols, 1903, 1904, that are less than O2min slots, 1099, before the start of the reception occasion of the paging PDCCH.

In one example for receiving TRS/CSI-RS with validation based on detection of a paging PDCCH, the UE provides that the TRS/CSI-RS and the paging PDCCH is QCLed with respect to Doppler spread, Doppler shift, average gain, average delay, delay spread, and, when applicable, spatial Rx parameters.

In another example for receiving TRS/CSI-RS with validation based on detection of a paging PDCCH, the UE measures L1-RSRP or L1-RSRQ of the serving cell based on the received TRS/CSI-RS for radio resource management in RRC_IDLE/INACTIVE state.

In one embodiment, validation of TRS/CSI-RS reception from a serving cell in RRC_IDLE/INACTIVE state is provided based on an SMTC window. The SMTC is used for SS/PBCH based intra-frequency RRM measurement for cells with carrier frequency same as the serving cell. When a UE is provided with a configuration of periodic/semi-persistent TRS/CSI-RS resources, the UE determines whether or not to receive TRS/CSI-RS in configured set of symbols according to a validation approach based on SMTC window.

Figure 20:
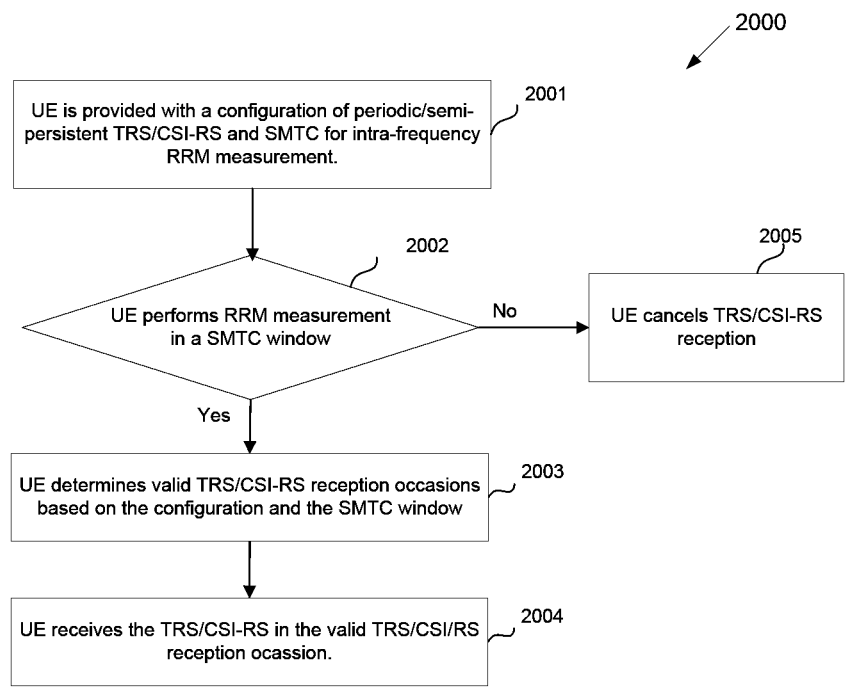
FIG. 20 illustrates yet another flowchart of a method of UE for validation of TRS/CSI-RS reception according to embodiments of the present disclosure.

FIG. 20 illustrates yet another flowchart of a method 2000 of UE for validation of TRS/CSI-RS reception based on a SMTC window according to embodiments of the present disclosure. For example, the method 2000 may be implemented by a UE, such as UE 116 in FIG. 1 An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, a UE can be provided with a configuration of periodic/semi-persistent TRS/CSI-RS resources and SMTC for intra-frequency RRM measurement, at step 2001. The UE determines whether or not to perform RRM measurement in a SMTC window, at step 2002. If the UE performs RRM measurement based on SS/PBCH blocks in a SMTC window, the UE then determines valid TRS/CSI-RS reception occasions based on the configuration and the SMTC window, at step 2003; otherwise, the UE assumes no valid TRS/CSI-RS reception occasion, and the UE cancels the TRS/CSI-RS reception, at step 2005. A UE receives TRS/CSI-RS in the valid TRS/CSI-RS reception occasion, at step 2004.

In one example, validating TRS/CSI-RS reception based on a SMTC window is provided. For validating a set of symbols configured to receive TRS/CSI-RS, a UE receives TRS/CSI-RS in one or more symbols from the set of symbols if the one or more symbols are contained in the SMTC window. In one example, the one or more symbols from the set of symbols can be the symbols where the UE receives SS/PBCH blocks within the SMTC window. In this case, the TRS/CSI-RS and SS/PBCH blocks are transmitted from the serving cell in same time domain resources, but in non-overlapping frequency resources. In another example, the one or more symbols from the set of symbols can be the symbols where the UE does not expect to receive any SS/PBCH block within the SMTC window. In this case, the TRS/CSI-RS and SS/PBCH blocks are transmitted from the serving cell in non-overlapping time domain resources. For invalidating a set of symbols configured to receive TRS/CSI-RS, the UE cancels TRS/CSI-RS reception in one or more symbols from the set of symbols if the one or more symbols are not contained in the SMTC window.

In one example, validating TRS/CSI-RS reception based on detection of a SMTC window is provided. For validating a set of symbols configured to receive TRS/CSI-RS, a UE receives TRS/CSI-RS in the set of symbols if one or more symbols from the set of symbols are contained in the SMTC window. For invalidating a set of symbols configured to receive TRS/CSI-RS, the UE cancels TRS/CSI-RS reception in the set of symbols if no symbol from the set of symbols is contained in the reception occasion of the SMTC window.

In one example, validating TRS/CSI-RS reception based on a SMTC window is provided. For validating a set of symbols configured to receive TRS/CSI-RS, a UE receives TRS/CSI-RS in a symbol from the set of symbols if the symbol is after the SMTC window, and the time offset, O1, between the symbol and end of the SMTC window is less or no larger than O1min. For invalidating a set of symbols configured to receive TRS/CSI-RS, a UE cancels TRS/CSI-RS reception in a symbol from the set of symbols if the symbol is not after the SMTC window, or the time offset, O1, between the symbol and end of the SMTC window is no smaller or larger than O1min. The unit of O1 and $O1_{min}$ can be one slot or one millisecond or one symbol.

The minimum time offset, $O1_{min}$, can be determined by a UE through any of the following methods: (1) $O1_{min}$ is predefined in the specification of system operation, e.g., $O1_{min}=2$ slots; (2) $O1_{min}$ is provided to a UE through higher layer signaling; and/or (3) $O1_{min}$ is reported by a UE to a gNB as one of UE capabilities.

In one example, validating TRS/CSI-RS reception based on a SMTC window is provided. For validating a set of symbols configured to receive TRS/CSI-RS, a UE receives TRS/CSI-RS in a symbol from the set of symbols if the symbol is before the SMTC window, and the time offset, O2, between the symbol and start of the SMTC window is less or no larger than O2min. For invalidating a set of symbols configured to receive TRS/CSI-RS, a UE cancels TRS/CSI-RS reception in a symbol from the set of symbols if the symbol is not before the SMTC window, or the time offset, O2, between the symbol and start of the SMTC window is no smaller or larger than O2min. The unit of O2 and $O2_{min}$ can be one slot or one millisecond or one symbol.

The minimum time offset, $O2_{min}$, can be determined by a UE through any of the following methods: (1) $O2_{min}$ is predefined in the specification of system operation, e.g., $O2_{min}=2$ slots; and/or (2) O2min is provided to a UE through higher layer signaling.

Figure 21:
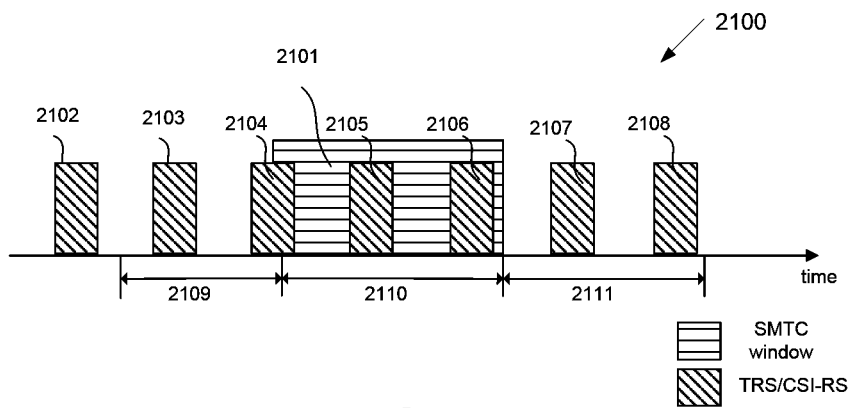
FIG. 21 illustrates yet another example of TRS/CSI-RS validation according to embodiments of the present disclosure.

FIG. 21 illustrates yet another example of TRS/CSI-RS validation 2100 based on a SMTC window according to embodiments of the present disclosure. An embodiment of the TRS/CSI-RS validation 2100 shown in FIG. 21 is for illustration only.

As illustrated in FIG. 21, a UE performs intra-frequency RRM measurement in a SMTC window, 2101. The UE is provided with periodic/semi-persistent TRS/CSI-RS with configured sets of symbols, 2102-2108, to receive TRS/CSI-RS.

In one example for validating TRS/CSI-RS reception based on a SMTC window, the UE receives TRS/CSI-RS in symbols from the configured sets of symbols that are within the SMTC window, i.e., symbols from 2104, 2105, and 2106 that are within the SMTC window, 2110.

In one example for validating TRS/CSI-RS reception based on a SMTC window, the UE receives TRS/CSI-RS in the configured sets of symbols that overlaps with the SMTC window, i.e., 2104, 2105, and 2106.

In one example for validating TRS/CSI-RS reception based on SMTC window, the UE receives TRS/CSI-RS in the configured sets of symbols, 2107, 2108 that are less than O1min slots, 2111, after the end of the SMTC window.

In one example for validating TRS/CSI-RS reception based on detection of a SMTC window, the UE receives TRS/CSI-RS in the symbols from the configured sets of symbols, 2103, 2104, that are less than O2min slots, 2109, before the start of the SMTC window.

In one example for receiving TRS/CSI-RS with validation based on a SMTC window, the UE provides that the TRS/CSI-RS and the SS/PBCH blocks from the serving cell within the SMTC window is QCLed with respect to Doppler spread, Doppler shift, average gain, average delay, delay spread, and, when applicable, spatial Rx parameters. In one example, there are more than one valid set of TRS/CSI-RS resources. In this case, a UE assumes the kth set of TRS/CSI-RS resources is QCLed with the kth SS/PBCH block out from the N1 SS/PBCH blocks within the SMTC window. In one example of determining the number of SS/PBCH blocks, N1, N1 is the actual transmitted SS/PBCH blocks per a SS/PBCH block burst from the serving cell, which is indicated by ssb-PositionsInBurst by higher layers. In another example of determining the number of SS/PBCH blocks, N1, N1 is the number of SS/PBCH blocks for RRM measurement associated with a SMTC, and N1 is indicated by ssb-ToMeasure by higher layers.

In another example for receiving TRS/CSI-RS with validation based on based on a SMTC window, the UE provides the TRS/CSI-RS is associated with the SS/PBCH blocks from the serving cell within the SMTC window, such that the UE determines the timing of TRS/CSI-RS according to the timing of the SS/PBCH blocks from the serving cell within the SMTC window.

In yet another example for receiving TRS/CSI-RS with validation based on based on a SMTC window, the UE measures L1-RSRP or L1-RSRQ of the serving cell based on the received TRS/CSI-RS for radio resource management in RRC_IDLE/INACTIVE state.

In one embodiment, validation of TRS/CSI-RS reception from a serving cell based on an MTC for TRS/CSI-RS reception is provided. The MTC is referred as CMTC in this disclosure. A UE can be provided with a configuration periodic/semi-persistent TRS/CSI-RS and CMTC. The CMTC includes a time duration or a periodicity of a CMTC window. When a UE is provided with a configuration of periodic/semi-persistent TRS/CSI-RS resources and CMTC, the UE determines whether or not to receive TRS/CSI-RS in configured set of symbols according to a validation approach based on CMTC window.

Figure 22:
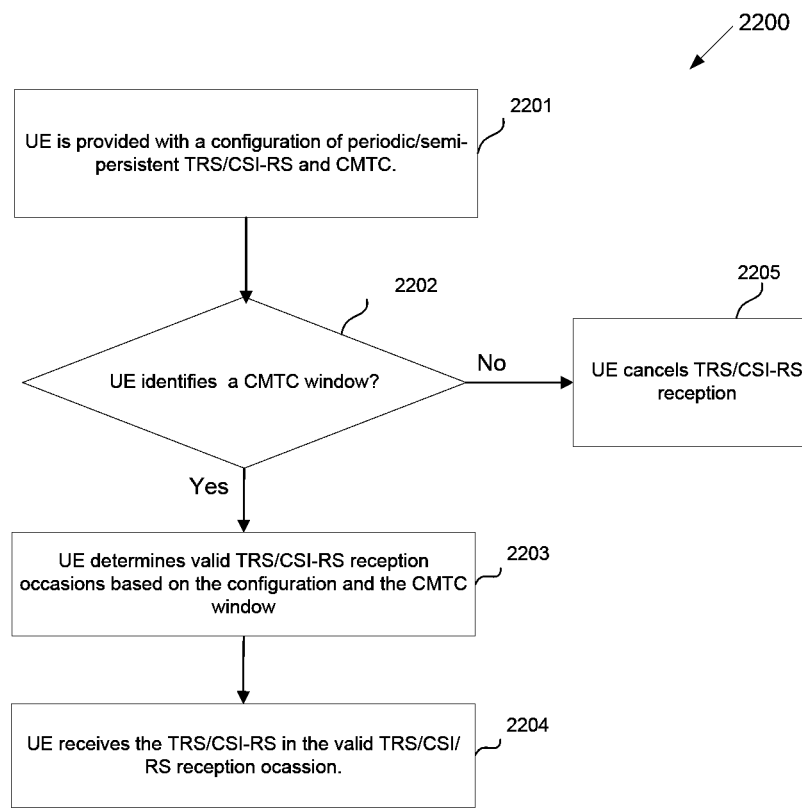
FIG. 22 illustrates yet another flowchart of a method of UE for validation of TRS/CSI-RS reception according to embodiments of the present disclosure.

FIG. 22 illustrates yet another flowchart of a method 2200 of UE for validation of TRS/CSI-RS reception based on a CMTC window according to embodiments of the present disclosure. For example, the method 2200 may be implemented by a UE, such as UE 116 in FIG. 1 An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, a UE can be provided with a configuration of periodic/semi-persistent TRS/CSI-RS resources and CMTC, at step 2201. The UE determines whether or not there is a CMTC window, at step 2202. If the UE identifies a CMTC window, the UE then determines valid TRS/CSI-RS reception occasions based on the configuration and the CMTC window, at step 2203; otherwise, the UE assumes no valid TRS/CSI-RS reception occasion, and the UE cancels the TRS/CSI-RS reception, at step 2205. A UE receives TRS/CSI-RS in the valid TRS/CSI-RS reception occasion, at step 2204.

In one example, validating TRS/CSI-RS reception based on a CMTC window is provided. For validating a set of symbols configured to receive TRS/CSI-RS, a UE receives TRS/CSI-RS in one or more symbols from the set of symbols if the one or more symbols are contained in the CMTC window. For invalidating a set of symbols configured to receive TRS/CSI-RS, the UE cancels TRS/CSI-RS reception in one or more symbols from the set of symbols if the one or more symbols are not contained in the CMTC window.

FIG. 23 illustrates yet another example of TRS/CSI-RS validation 2300 based on a CMTC window according to embodiments of the present disclosure. An embodiment of the TRS/CSI-RS validation 2300 shown in FIG. 23 is for illustration only.

As illustrated in FIG. 23, 2301 indicates the periodicity of CMTC window, and 2302 indicates the duration of CMTC window. A UE is provided with periodic/semi-persistent TRS/CSI-RS with periodicity, 2306. For configured TRS/CSI-RS reception occasions, 2303, and 2306, a UE receives TRS/CSI-RS in the configured reception occasions as TRS/CSI-RS reception occasions are within a CMTC window. For configured TRS/CSI-RS reception occasions, 2304, and 2305, a UE cancels TRS/CSI-RS reception in the configured reception occasions as TRS/CSI-RS reception occasions are not within a CMTC window.

In one example, validating TRS/CSI-RS reception based on CMTC window is provided. A UE receives a configuration of SMTC for SS/PBCH blocks based RRM measurement. For a CMTC window, if the time offset between the CMTC window and a SMTC window, O, is smaller or no larger than a predetermined value, $O_{min}$, the UE receives TRS/CSI-RS in the CMTC window; otherwise, the UE cancels TRS/CSI-RS in the CMTC window. The unit of O and $O_{min}$ can be one slot, or one millisecond, or one symbol.

The minimum time offset, $O_{min}$, can be determined by a UE through one of the following methods: (1) $O_{min}$ is predefined in the specification of system operation, e.g., $O_{min}$=2 slots; (2) $O_{min}$ is provided to a UE through higher layer signaling; and/or (3) $O_{min}$ is reported by a UE to a gNB as one of UE capabilities.

FIG. 24 illustrates an example timeline for TRS/CSI-RS validation 2400 based on a CMTC window according to embodiments of the present disclosure. An embodiment of the timeline for TRS/CSI-RS validation 2400 shown in FIG. 24 is for illustration only.

The UE can determines O based on any of the following methods: (1) the CMTC window is before the SMTC window, and O is the time offset between the start slot or first symbol of the CMTC window and the start slot of the SMTC window, 2401; (2) the CMTC window is before the SMTC window, and O is the time offset between the last slot or last symbol of the CMTC window and the start slot of the SMTC window, 2402; (3) the CMTC window is after the SMTC window, and O is the time offset between the start slot or first symbol of the CMTC window and the start slot of the SMTC window, 2403; and/or (4) the CMTC window is after the SMTC window, and O is the time offset between the start slot or first symbol of the CMTC window and the last slot of the SMTC window, 2404.

In one example for receiving TRS/CSI-RS with second approach for validating TRS/CSI-RS reception based on CMTC window, the UE provides that the TRS/CSI-RS within a CMTC window and SS/PBCH blocks within the SMTC window is QCLed with respect to Doppler spread, Doppler shift, average gain, average delay, delay spread, and, when applicable, spatial Rx parameters. In one example, there are more than one valid set of TRS/CSI-RS resources. In this case, a UE assumes the kth set of TRS/CSI-RS resources is QCLed with the kth SS/PBCH block out from the N1 SS/PBCH blocks transmitted by the serving cell within the SMTC window. In one example of determining the number of SS/PBCH blocks, N1, N1 is the actual transmitted SS/PBCH blocks per a SS/PBCH block burst from the serving cell, which is indicated by ssb-PositionsInBurst by higher layers. In another example of determining the number of SS/PBCH blocks, N1, N1 is the number of SS/PBCH blocks for RRM measurement associated with SMTC, and N1 is indicated by ssb-ToMeasure by higher layers.

In another example for receiving TRS/CSI-RS with second approach for validating TRS/CSI-RS reception based on CMTC window, the UE provides the TRS/CSI-RS is associated with the SS/PBCH blocks from the serving cell within the SMTC window, such that the UE determine the timing of TRS/CSI-RS according to the timing of the SS/PBCH blocks from the serving cell within the SMTC window.

In yet another example for receiving TRS/CSI-RS with validation based on CMTC window, the UE measures L1-RSRP or L1-RSRQ of the serving cell based on the received TRS/CSI-RS for radio resource management in RRC_IDLE/INACTIVE state.

In one embodiment, validation of TRS/CSI-RS reception from a serving cell based on a PO is provided. A PO consists of one or more PDCCH monitoring occasions for paging. When a UE is provided with a configuration of periodic/semi-persistent TRS/CSI-RS resources, the UE determines whether or not to receive TRS/CSI-RS in configured set of symbols according to a validation approach based on a PO.

Figure 25:
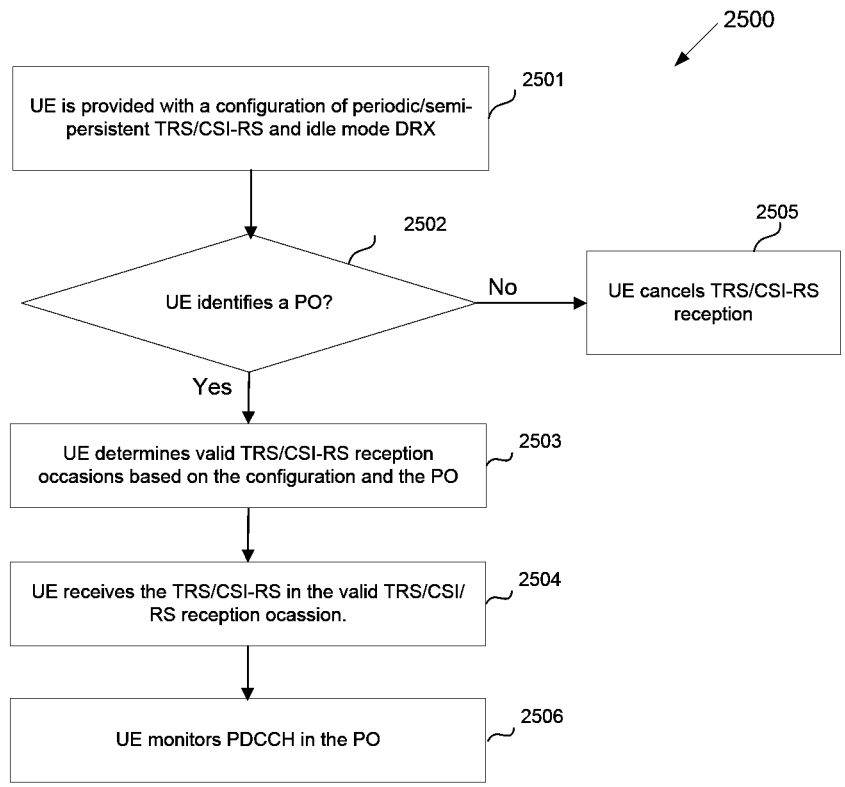
FIG. 25 illustrates yet another flowchart of a method of UE for validation of TRS/CSI-RS reception according to embodiments of the present disclosure.

FIG. 25 illustrates yet another flowchart of a method 2500 of UE for validation of TRS/CSI-RS reception based on a PO according to embodiments of the present disclosure. For example, the method 2500 may be implemented by a UE, such as UE 116 in FIG. 1 An embodiment of the method 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

As illustrated in FIG. 25, a UE can be provided with a configuration of periodic/semi-persistent TRS/CSI-RS resources and discontinuous reception in RRC_IDLE/INACTIVE state (I-DRX), at step 2501. The UE determines whether or not there is a PO based on the configured I-DRX, at step 2502. If the UE identifies a PO, the UE then determines valid TRS/CSI-RS reception occasions based on the configuration and the PO, at step 2503; otherwise, the UE assumes no valid TRS/CSI-RS reception occasion, and the UE cancels the TRS/CSI-RS reception, at step 2505. A UE receives TRS/CSI-RS in the valid TRS/CSI-RS reception occasion, at step 2504. The UE monitors PDCCH for DCI format with CRC scrambled by P-RNTI in the PO, at step 2506.

In one example, validating TRS/CSI-RS reception based on a PO is provided. For validating a set of symbols configured to receive TRS/CSI-RS, a UE receives TRS/CSI-RS in one or more symbols from the set of symbols if the one or more symbols are contained in the PO. For invalidating a set of symbols configured to receive TRS/CSI-RS, the UE cancels TRS/CSI-RS reception in one or more symbols from the set of symbols if the one or more symbols are not contained in the PO.

In one example, validating TRS/CSI-RS reception based on detection of a PO is provided. For validating a set of symbols configured to receive TRS/CSI-RS, a UE receives TRS/CSI-RS in the set of symbols if one or more symbols from the set of symbols are contained in the PO. For invalidating a set of symbols configured to receive TRS/CSI-RS, the UE cancels TRS/CSI-RS reception in the set of symbols if no symbol from the set of symbols is contained in the PO.

In one example, validating TRS/CSI-RS reception based on a PO is provided. For validating a set of symbols configured to receive TRS/CSI-RS, a UE receives TRS/CSI-RS in a symbol from the set of symbols if the symbol is before the PO, and the time offset, O, between the symbol and start of the PO is less or no larger than $O_{min}$. For invalidating a set of symbols configured to receive TRS/CSI-RS, a UE cancels TRS/CSI-RS reception in a symbol from the set of symbols if the symbol is not before the PO, or the time offset, O, between the symbol and start of the PO is no smaller or larger than $O_{min}$. The unit of O and $O_{min}$ can be one slot or one millisecond or one symbol. The start of a PO can be the first slot or first symbol of the PO.

The minimum time offset, $O_{min}$, can be determined by a UE through any of the following methods: (1) $O_{min}$ is predefined in the specification of system operation, e.g., $O_{min}=2$ slots; (2) $O_{min}$ is provided to a UE through higher layer signaling; and/or (3) $O_{min}$ is reported by a UE to a gNB as one of UE capabilities.

Figure 26:
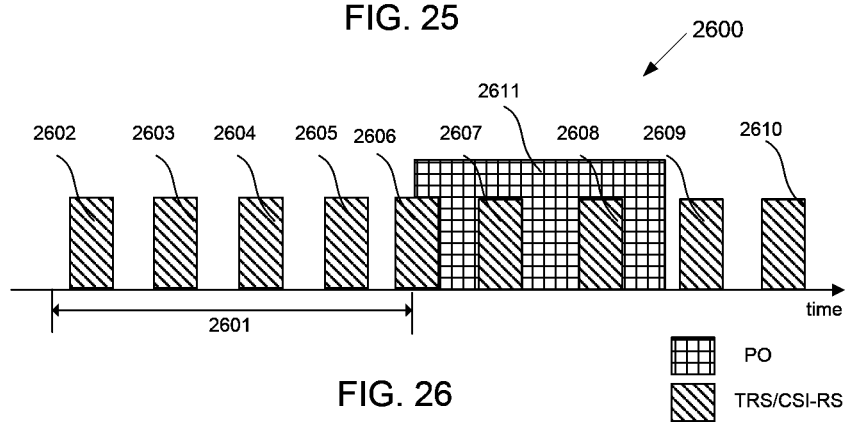
FIG. 26 illustrates an example timeline for TRS/CSI-RS validation according to embodiments of the present disclosure.

FIG. 26 illustrates an example timeline for TRS/CSI-RS validation 2600 based on a PO according to embodiments of the present disclosure. An embodiment of the timeline for TRS/CSI-RS validation 2600 shown in FIG. 26 is for illustration only.

As illustrated in FIG. 26, a UE identifies a PO to receive PDCCH for DCI format with CRC scrambled by P-RNTI, 2611. The UE is provided with periodic/semi-persistent TRS/CSI-RS with configured sets of symbols, 2602-2610, to receive TRS/CSI-RS.

In one example for validating TRS/CSI-RS reception based on a PO, the UE receives TRS/CSI-RS in symbols from the configured sets of symbols that are within the PO, i.e., symbols from 2606, 2607, and 2608 that are within the PO, 2611.

In one example for validating TRS/CSI-RS reception based on a PO, the UE receives TRS/CSI-RS in the configured sets of symbols that overlaps within the PO, i.e., 2606, 2607, and 2608.

In one example for validating TRS/CSI-RS reception based on a PO, the UE receives TRS/CSI-RS in the symbols from the configured sets of symbols, 2602, 2603, 2604, 2605, 2506, that are less than $O_{min}$ slots, 2601, before the start of the PO.

In one example for receiving TRS/CSI-RS with validation based on a PO, the UE provides that the TRS/CSI-RS reception and the DMRS of PDCCHs in the PO is QCLed with respect to Doppler spread, Doppler shift, average gain, average delay, delay spread, and, when applicable, spatial Rx parameters. In one example, there are S>=1 sets of TRS/CSI-RS resources, and S equals the number of PDCCH monitoring occasions for paging within a PO. The UE assumes that the kth set of TRS/CSI-RS resources and the DMRS of PDCCHs received in the kth PDCCH monitoring occasion from the PO is QCLed.

In one example for receiving TRS/CSI-RS with validation based on a PO, the UE measures L1-RSRP or L1-RSRQ of the serving cell based on the received TRS/CSI-RS for radio resource management in RRC_IDLE/INACTIVE state.

In one embodiment, validation of TRS/CSI-RS reception in RRC_IDLE/INACTIVE state is provided based on detection of a physical layer signal/channel that indicates a UE to wake up for next PO. The physical layer signal/channel is referred as idle mode wake-up signal (I-WUS) in this disclosure. A reception occasion of a I-WUS can be the slots or symbols where a UE receives the I-WUS. When a UE is provided with a configuration of periodic/semi-persistent TRS/CSI-RS resources to receive in RRC_IDLE/INACTIVE state, the UE determines whether or not to receive TRS/CSI-RS in configured set of symbols according to a validation approach based on detection of I-WUS.

Figure 27:
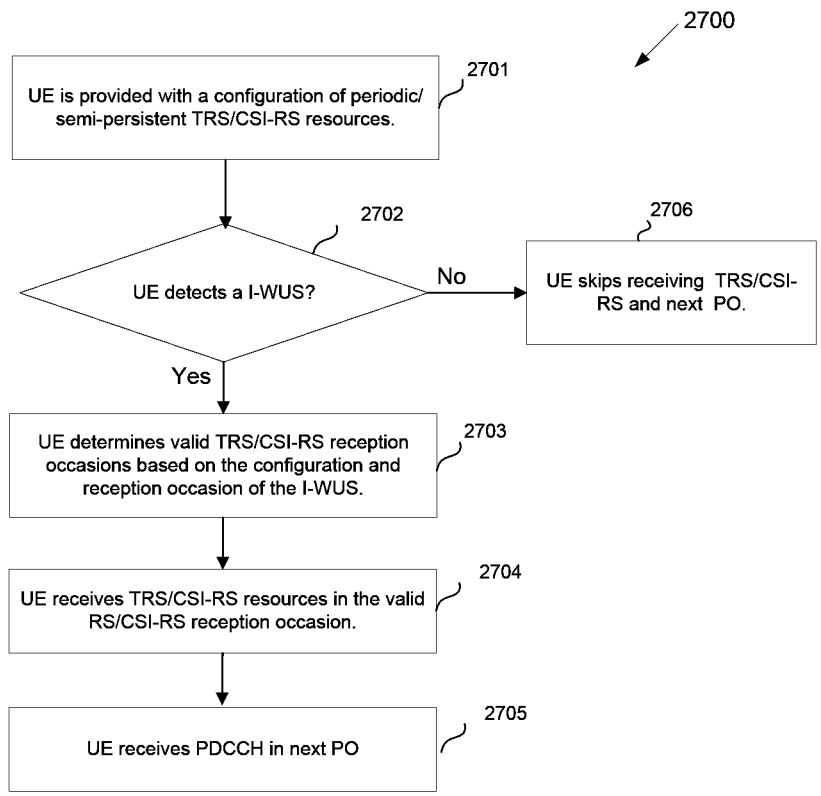
FIG. 27 illustrates yet another flowchart of a method of UE for validation of TRS/CSI-RS reception according to embodiments of the present disclosure.

FIG. 27 illustrates yet another flowchart of a method 2700 of UE for validation of TRS/CSI-RS reception based on detection of an I-WUS according to embodiments of the present disclosure. For example, the method 2700 may be implemented by a UE, such as UE 116 in FIG. 1 An embodiment of the method 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions.

A UE can be provided with a configuration of periodic/semi-persistent TRS/CSI-RS resources from a serving cell, at step 2701. When the UE operates in RRC_IDLE/INACTIVE state, the UE determines whether or not the UE detects a I-WUS from the serving cell, at step 2702. If the UE detects a I-WUS, the UE then determines valid TRS/CSI-RS reception occasion according to the configuration and reception occasion of the I-WUS, at step 2703; otherwise, the UE assume there is no valid TRS/CSI-RS reception occasion and a UE cancels TRS/CSI-RS reception in the configured reception occasions, and skips next PO resources, at step 2706. The UE receives TRS/CSI-RS resources in the valid TRS/CSI-RS reception occasion, at step 2704. The UE receives PDCCH in next PO, at step 2705.

In one example, validating TRS/CSI-RS reception based on detection of a I-WUS in a reception occasion is provided. For validating a set of symbols configured to receive TRS/CSI-RS, a UE receives TRS/CSI-RS in one or more symbols from the set of symbols if the one or more symbols are contained in the reception occasion of the I_WUS. For invalidating a set of symbols configured to receive TRS/CSI-RS, the UE cancels TRS/CSI-RS reception in one or more symbols from the set of symbols if the one or more symbols are not contained in the reception occasion of the I_WUS.

In one example, validating TRS/CSI-RS reception based on detection of I-WUS in a reception occasion is provided. For validating a set of symbols configured to receive TRS/CSI-RS, a UE receives TRS/CSI-RS in the set of symbols if one or more symbols from the set of symbols are contained in the reception occasion of the I_WUS. For invalidating a set of symbols configured to receive TRS/CSI-RS, the UE cancels TRS/CSI-RS reception in the set of symbols if no symbol from the set of symbols is contained in the reception occasion of the I_WUS.

In one example, validating TRS/CSI-RS reception based on detection of I-WUS in a reception occasion is provided. For validating a set of symbols configured to receive TRS/CSI-RS, a UE receives TRS/CSI-RS in a symbol from the set of symbols if the symbol is after the reception occasion of the I_WUS, and the time offset, O1, between the symbol and end of the reception occasion of the I_WUS is less or no larger than O1min. For invalidating a set of symbols configured to receive TRS/CSI-RS, a UE cancels TRS/CSI-RS reception in a symbol from the set of symbols if the symbol is not after the reception occasion of the I_WUS, or the time offset, O1, between the symbol and end of the reception occasion of the I_WUS is no smaller or larger than O1min. The unit of O1 and $O1_{min}$ can be one slot or one millisecond or one symbol.

The minimum time offset, $O1_{min}$, can be determined by a UE through any of the following methods: (1) $O1_{min}$ is predefined in the specification of system operation, e.g., $O1_{min}$=2 slots; (2) $O2_{min}$ is provided to a UE through higher layer signaling; and/or (3) O1min is reported by a UE to a gNB as one of UE capabilities.

In one example, validating TRS/CSI-RS reception based on detection of I-WUS in a reception occasion is provided. For validating a set of symbols configured to receive TRS/CSI-RS, a UE receives TRS/CSI-RS in a symbol from the set of symbols if the symbol is before the reception occasion of the I_WUS, and the time offset, O2, between the symbol and start of the reception occasion of the I_WUS is less or no larger than $O2_{min}$. For invalidating a set of symbols configured to receive TRS/CSI-RS, a UE cancels TRS/CSI-RS reception in a symbol from the set of symbols if the symbol is not before the reception occasion of the I_WUS, or the time offset, O2, between the symbol and start of the reception occasion of the I_WUS is no smaller or larger than $O2_{min}$. The unit of O2 and $O2_{min}$ can be one slot or one millisecond or one symbol.

The minimum time offset, $O2_{min}$, can be determined by a UE through any of the following methods: (1) $O2_{min}$ is predefined in the specification of system operation, e.g., $O2_{min}$=2 slots; (2) $O2_{min}$ is provided to a UE through higher layer signaling; and/or (3) $O2_{min}$ is reported by a UE to a gNB as one of UE capabilities.

Figure 28:
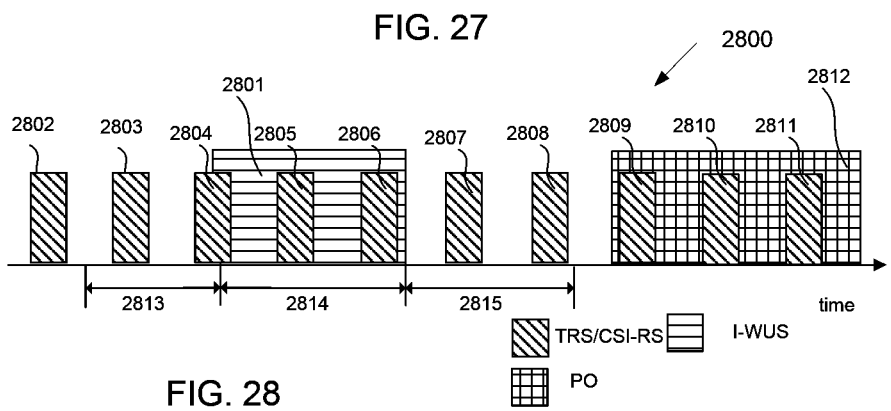
FIG. 28 illustrates an example timeline of TRS/CSI-RS reception with validation according to embodiments of the present disclosure.

FIG. 28 illustrates an example timeline of TRS/CSI-RS reception with validation 2800 based on detection of an I-WUS according to embodiments of the present disclosure. An embodiment of the timeline of TRS/CSI-RS reception with validation 2800 shown in FIG. 28 is for illustration only.

As illustrated in FIG. 28, a UE detects an I-WUS, 2805, that indicates a UE to receive PDCCH in next PO, 2812. The UE is provided with periodic/semi-persistent TRS/CSI-RS with configured sets of symbols, 2802-2811, to receive TRS/CSI-RS.

In one example for validating TRS/CSI-RS reception based on detection of I_WUS, the UE receives TRS/CSI-RS in symbols from the configured sets of symbols that are within the reception occasion of the I_WUS, i.e., symbols from 2804, 2805, and 2806 that are within the reception occasion of the I_WUS, 2814.

In one example for validating TRS/CSI-RS reception based on detection of I_WUS, the UE receives TRS/CSI-RS in the configured sets of symbols that overlaps with the reception occasion of the I_WUS, i.e., 2804, 2805, and 2806.

In one example for validating TRS/CSI-RS reception based on detection of I_WUS, the UE receives TRS/CSI-RS in the configured sets of symbols, 2807, 2808 that are less than O1min slots, 2815, after the end of the reception occasion of the I_WUS.

In one example for validating TRS/CSI-RS reception based on detection of I_WUS, the UE receives TRS/CSI-RS in the symbols from the configured sets of symbols, 2803, 2804, that are less than O2min slots, 2813, before the start of the reception occasion of the I_WUS.

In one example for receiving TRS/CSI-RS with validation based on detection of a I_WUS, the UE provides that the TRS/CSI-RS reception and the I_WUS is QCLed with respect to Doppler spread, Doppler shift, average gain, average delay, delay spread, and, when applicable, spatial Rx parameters.

In another example for receiving TRS/CSI-RS with validation based on detection of a I_WUS, the UE measures L1-RSRP or L1-RSRQ of the serving cell based on the received TRS/CSI-RS for radio resource management in RRC_IDLE/INACTIVE state.

In one embodiment, validation of TRS/CSI-RS reception based on detection of a PDSCH that includes paging message is provided. The PDSCH is referred as paging PDSCH in this disclosure for benefit of simplified expression. A reception occasion of a paging PDSCH can be the slot(s) or symbols where a UE receives the paging PDSCH. When a UE is provided with a configuration of periodic/semi-persistent TRS/CSI-RS resources, the UE determines whether or not to receive TRS/CSI-RS in configured set of symbols according to a validation approach based detection of a paging PDSCH.

Figure 29:
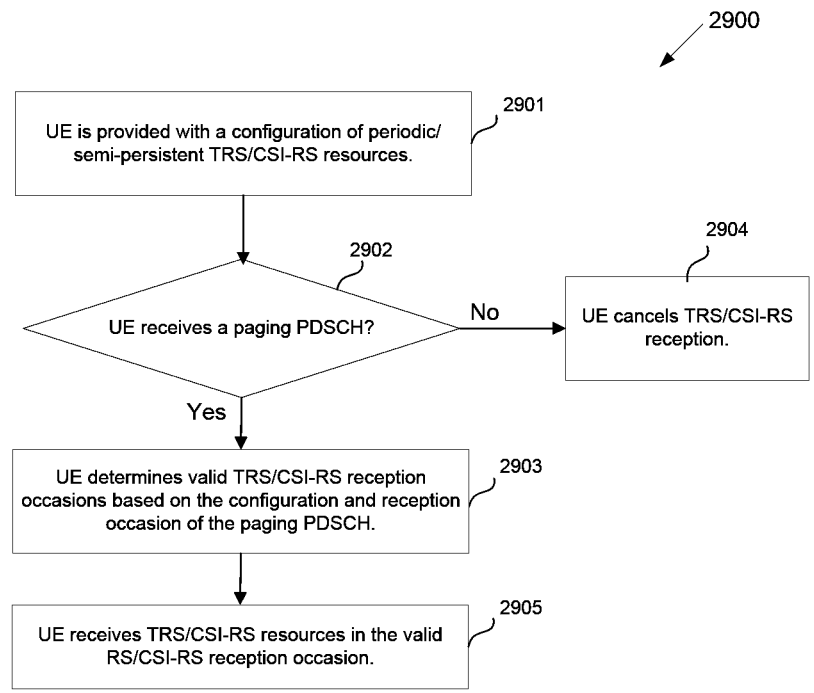
FIG. 29 illustrates yet another flowchart of a method of UE for validation of TRS/CSI-RS reception according to embodiments of the present disclosure.

FIG. 29 illustrates yet another flowchart of a method 2900 of UE for validation of TRS/CSI-RS reception based on detection of paging PDSCH in a RRC_IDLE/INACTIVE state according to embodiments of the present disclosure. For example, the method 2900 may be implemented by a UE, such as UE 116 in FIG. 1 An embodiment of the method 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions.

A UE can be provided with a configuration of periodic/semi-persistent TRS/CSI-RS resources from a serving cell in RRC_IDLE/INACTIVE state, at step 2901. The UE determines whether or not the UE detects a paging PDSCH from the serving cell, at step 2902. If the UE detects a paging PDCCH from the serving cell, the UE then determines valid TRS/CSI-RS reception occasion according to the configuration and reception occasion of the paging PDSCH, at step 2903; otherwise, the UE assume there is no valid TRS/CSI-RS reception occasion and the UE cancels the TRS/CSI-RS reception at step 2904. The UE receives TRS/CSI-RS resources in the valid TRS/CSI-RS reception occasion, at step 2905.

In one example, validating TRS/CSI-RS reception based on detection of a paging PDSCH in a reception occasion is provided. For validating a set of symbols configured to receive TRS/CSI-RS, a UE receives TRS/CSI-RS in one or more symbols from the set of symbols if the one or more symbols are contained in the reception occasion of the paging PDSCH. For invalidating a set of symbols configured to receive TRS/CSI-RS, the UE cancels TRS/CSI-RS reception in one or more symbols from the set of symbols if the one or more symbols are not contained in the reception occasion of the paging PDSCH.

In one example, validating TRS/CSI-RS reception based on detection of a paging PDSCH in a reception occasion is provided. For validating a set of symbols configured to receive TRS/CSI-RS, a UE receives TRS/CSI-RS in the set of symbols if one or more symbols from the set of symbols are contained in the reception occasion of the paging PDSCH. For invalidating a set of symbols configured to receive TRS/CSI-RS, the UE cancels TRS/CSI-RS reception in the set of symbols if no symbol from the set of symbols is contained in the reception occasion of the paging PDSCH.

In one example, validating TRS/CSI-RS reception based on detection of a paging PDSCH in a reception occasion is provided. For validating a set of symbols configured to receive TRS/CSI-RS, a UE receives TRS/CSI-RS in a symbol from the set of symbols if the symbol is after the reception occasion of the paging PDSCH, and the time offset, O1, between the symbol and end of the reception occasion of the paging PDSCH is less or no larger than O1min. For invalidating a set of symbols configured to receive TRS/CSI-RS, a UE cancels TRS/CSI-RS reception in a symbol from the set of symbols if the symbol is not after the reception occasion of the paging PDSCH, or the time offset, O1, between the symbol and end of the reception occasion of the paging PDSCH is no smaller or larger than O1min. The unit of O1 and $O1_{min}$ can be one slot or one millisecond or one symbol.

The minimum time offset, O1min, can be determined by a UE through any of the following methods: (1) $O1_{min}$ is predefined in the specification of system operation, e.g., $O1_{min}$=2 slots; (2) $O1_{min}$ is provided to a UE through higher layer signaling; and/or (3) $O1_{min}$ is reported by a UE to a gNB as one of UE capabilities.

In one example, validating TRS/CSI-RS reception based on detection of a paging PDSCH in a reception occasion is provided. For validating a set of symbols configured to receive TRS/CSI-RS, a UE receives TRS/CSI-RS in a symbol from the set of symbols if the symbol is before the reception occasion of the paging PDSCH, and the time offset, O2, between the symbol and start of the reception occasion of paging PDSCH is less or no larger than O2min. For invalidating a set of symbols configured to receive TRS/CSI-RS, a UE cancels TRS/CSI-RS reception in a symbol from the set of symbols if the symbol is not before the reception occasion of the paging PDSCH, or the time offset, O2, between the symbol and start of the reception occasion of the paging PDSCH is no smaller or larger than O2min. The unit of O2 and $O2_{min}$ can be one slot or one millisecond or one symbol.

The minimum time offset, O2min, can be determined by a UE through any of the following methods: (1) $O2_{min}$ is predefined in the specification of system operation, e.g., $O2_{min}$=2 slots; (2) $O2_{min}$ is provided to a UE through higher layer signaling; and/or (3) $O2_{min}$ is reported by a UE to a gNB as one of UE capabilities.

Figure 30:
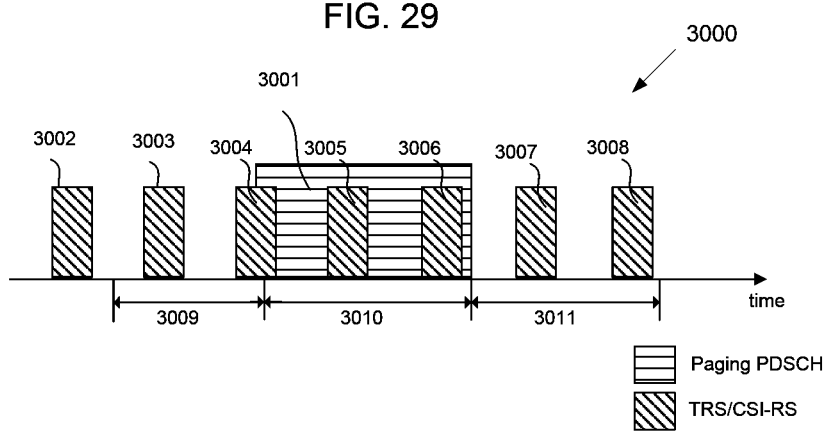
FIG. 30 illustrates an example timeline of TRS/CSI-RS validation according to embodiments of the present disclosure.

FIG. 30 illustrates an example timeline of TRS/CSI-RS validation 3000 based on a detection of a paging PDSCH according to embodiments of the present disclosure. An embodiment of the timeline of TRS/CSI-RS validation 3000 shown in FIG. 30 is for illustration only.

As illustrated in FIG. 30, a UE detects a paging PDSCH, 3001. The UE is provided with periodic/semi-persistent TRS/CSI-RS with configured sets of symbols, 3002-3008, to receive TRS/CSI-RS.

In one example for validating TRS/CSI-RS reception based on detection of a paging PDSCH, the UE receives TRS/CSI-RS in symbols from the configured sets of symbols that are within the reception occasion of the paging PDSCH, i.e., symbols from 3004, 3005, and 3006 that are within the reception occasion of the paging PDSCH, 3010.

In one example for validating TRS/CSI-RS reception based on detection of paging a PDSCH, the UE receives TRS/CSI-RS in the configured sets of symbols that overlaps with the reception occasion of the paging PDSCH, i.e., 3004, 3005, and 3006.

In one example for validating TRS/CSI-RS reception based on detection of a paging PDSCH, the UE receives TRS/CSI-RS in the configured sets of symbols, 3007, 3008 that are less than O1min slots, 3011, after the end of the reception occasion of the paging PDSCH.

In one example for validating TRS/CSI-RS reception based on detection of a paging PDSCH, the UE receives TRS/CSI-RS in the symbols from the configured sets of symbols, 3003, 3004, that are less than O2min slots, 3009, before the start of the reception occasion of the paging PDSCH.

In one example for receiving TRS/CSI-RS with validation based on detection of a paging PDSCH, the UE provides that the TRS/CSI-RS and the paging PDSCH is QCLed with respect to Doppler spread, Doppler shift, average gain, average delay, delay spread, and, when applicable, spatial Rx parameters.

In another example for receiving TRS/CSI-RS with validation based on detection of a paging PDSCH, the UE measures L1-RSRP or L1-RSRQ of the serving cell based on the received TRS/CSI-RS for radio resource management in RRC_IDLE/INACTIVE state.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
by a system information block (SIB), a first configuration for periodic channel state information reference signal/tracking reference signal (CSI-RS/TRS) reception occasions for idle/inactive UEs, wherein a periodic CSI-RS/TRS reception occasion includes one or more CSI-RS resources,
a second configuration for a paging occasion (PO), and
a third configuration of physical downlink control channel (PDCCH) reception occasions, wherein a PDCCH provides a downlink control information (DCI) format that includes one or more availability indication bits for respective one or more periodic CSI-RS/TRS reception occasions from the periodic CSI-RS reception occasions; and
a processor operably connected to the transceiver, the processor configured to determine reception in a first periodic CSI-RS/TRS occasion based on a value of a respective first availability indication bit,
wherein the transceiver is further configured to receive in the first periodic CSI-RS/TRS occasion based on the determination.

2. The UE of claim 1, wherein the processor is further configured to determine a time duration, wherein an availability indication associated with the one or more availability indication bits expires by the time duration after a reception of the DCI format.

3. The UE of claim 1, wherein the processor is further configured to determine a CSI-RS resource in the periodic CSI-RS/TRS reception occasions is:
a TRS, or
a CSI-RS, wherein the CSI-RS has at least one of following predetermined parameters:
a density, wherein the density is same as a TRS or has a predetermined value,
a number of antenna ports, wherein the number of antenna ports is one, and
a code division multiplexing (CDM) type, wherein no CDM is used for the CSI-RS.

4. The UE of claim 1, wherein the first configuration includes a value for at least one of following parameters for a CSI-RS resource in the periodic CSI-RS/TRS reception occasions:
a power offset of a resource element (RE) for the CSI-RS resource to a RE for a secondary synchronization signal (SSS),
a scrambling identity (ID),
a bitmap to indicate one or more first orthogonal frequency-division multiplexing (OFDM) symbols in a slot,
a starting resource block (RB) to indicate a lowest RB index, and
a number of occupied RBs.

5. The UE of claim 1, wherein:
the transceiver is further configured to receive a fourth configuration for a burst of synchronization signals/physical broadcast channel (SS/PBCH) blocks; and
the processor is further configured to determine:
a downlink (DL) bandwidth part (BWP) for receiving the burst of SS/PBCH blocks, and
a frequency location of a CSI-RS resource in the periodic CSI-RS/TRS reception occasions as:
being within a bandwidth (BW) of the DL BWP, wherein a starting RB of the CSI-RS resource is relative to a first RB of the DL BWP with a lowest index, or
not being restricted by the BW of the DL BWP, wherein a starting RB of the CSI-RS resource is relative to a common RB with an index 0.

6. The UE of claim 5, wherein the processor is further configured to determine a spatial reception parameter for the CSI-RS resource in the periodic CSI-RS/TRS reception occasions is same as a spatial reception parameter for a SS/PBCH block in the burst of SS/PBCH blocks.

7. The UE of claim 5, wherein the processor is further configured to determine a sub-carrier spacing (SCS) for the periodic CSI-RS/TRS reception occasions is:
   same as a SCS of a DL BWP for receiving the burst of SS/PBCH blocks, or
   provided by the first configuration.

8. A base station (BS) comprising:
   a transceiver configured to transmit:
      by a system information block (SIB), a first configuration for periodic channel state information reference signal/tracking reference signal (CSI-RS/TRS) transmission occasions for idle/inactive UEs, wherein a periodic CSI-RS/TRS transmission occasion includes one or more CSI-RS resources,
      a second configuration for a paging occasion (PO), and
      a third configuration of physical downlink control channel (PDCCH) transmission occasions, wherein a PDCCH provides a downlink control information (DCI) format that includes one or more availability indication bits for respective one or more periodic CSI-RS/TRS transmission occasions from the periodic CSI-RS transmission occasions; and
   a processor operably connected to the transceiver, the processor configured to determine transmission in a first periodic CSI-RS/TRS occasion based on a value of a respective first availability indication bit,
   wherein the transceiver is further configured to transmit the first periodic CSI-RS/TRS occasion based on the determination.

9. The BS of claim 8, wherein the processor is further configured to determine a time duration, wherein an availability indication associated with the one or more availability indication bits expires by the time duration after a transmission of the DCI format.

10. The BS of claim 8, wherein a CSI-RS resource in the periodic CSI-RS/TRS transmission occasions is:
    a TRS, or
    a CSI-RS, wherein the CSI-RS has at least one of following predetermined parameters:
       a density, wherein the density is same as a TRS or has a predetermined value,
       a number of antenna ports, wherein the number of antenna ports is one, and
       a code division multiplexing (CDM) type, wherein no CDM is used for the CSI-RS.

11. The BS of claim 8, wherein the first configuration includes a value for at least one of following parameters for a CSI-RS resource in the periodic CSI-RS/TRS transmission occasions:
    a power offset of a resource element (RE) for the CSI-RS resource to a RE for a secondary synchronization signal (SSS),
    a scrambling identity (ID),
    a bitmap to indicate one or more first orthogonal frequency-division multiplexing (OFDM) symbols in a slot
    a starting resource block (RB) to indicate a lowest RB index, and
    a number of occupied RBs.

12. The BS of claim 8, wherein:
    the transceiver is further configured to transmit a fourth configuration for a burst of synchronization signals/physical broadcast channel (SS/PBCH) blocks; and
    the processor is further configured to determine:
       a downlink (DL) bandwidth part (BWP) for transmitting the burst of SS/PBCH blocks, and
       a frequency location of a CSI-RS resource in the periodic CSI-RS/TRS transmission occasions as:
          being within a bandwidth (BW) of the DL BWP, wherein a starting RB of the CSI-RS resource is relative to a first RB of the DL BWP with a lowest index, or
          not being restricted by the BW of the DL BWP, wherein a starting RB of the CSI-RS resource is relative to a common RB with an index 0.

13. The BS of claim 12, wherein the processor is configured to determine a spatial transmission parameter for the CSI-RS resource in the periodic CSI-RS/TRS transmission occasions is same as a spatial transmission parameter for a SS/PBCH block in the burst of SS/PBCH blocks.

14. The BS of claim 12, wherein the processor is further configured to determine a sub-carrier spacing (SCS) for the periodic CSI-RS/TRS transmission occasions is:
    same as a SCS of a DL BWP for transmitting the burst of SS/PBCH blocks, or
    provided by the first configuration.

15. A method comprising:
    receiving, by a system information block (SIB), a first configuration for periodic channel state information reference signal/tracking reference signal (CSI-RS/TRS) reception occasions for idle/inactive UEs, wherein a periodic CSI-RS/TRS reception occasion includes one or more CSI-RS resources;
    receiving a second configuration for a paging occasion (PO);
    receiving a third configuration of physical downlink control channel (PDCCH) reception occasions, wherein a PDCCH provides a downlink control information (DCI) format that includes one or more availability indication bits for respective one or more periodic CSI-RS/TRS reception occasions from the periodic CSI-RS reception occasions;
    determining reception in a first periodic CSI-RS/TRS occasion based on a value of a respective first availability indication bit; and
    receiving in the first periodic CSI-RS/TRS occasion based on the determination.

16. The method of claim 15, further comprising determining a time duration, wherein an availability indication associated with the one or more availability indication bits expires by the time duration after a reception of the DCI format.

17. The method of claim 15, further comprising determining a CSI-RS resource in the periodic CSI-RS/TRS reception occasions is:
    a TRS, or
    a CSI-RS, wherein the CSI-RS has at least one of following predetermined parameters:
       a density, wherein the density is same as a TRS or has a predetermined value,
       a number of antenna ports, wherein the number of antenna ports is one, and
       a code division multiplexing (CDM) type, wherein no CDM is used for the CSI-RS.

18. The method of claim 15, further comprising determining the first configuration includes a value for at least one of following parameters for a CSI-RS resource in the periodic CSI-RS/TRS reception occasions:
    a power offset of a resource element (RE) for the CSI-RS resource to a RE for a secondary synchronization signal (SSS),
    a scrambling identity (ID), a bitmap to indicate one or more first orthogonal frequency-division multiplexing (OFDM) symbols in a slot,
a starting resource block (RB) to indicate a lowest RB index, and
a number of occupied RBs.

19. The method of claim 15, further comprising:
receiving a fourth configuration for a burst of synchronization signals/physical broadcast channel (SS/PBCH) blocks;
determining a downlink (DL) bandwidth part (BWP) for receiving the burst of SS/PBCH blocks;
determining a frequency location of a CSI-RS resource in the periodic CSI-RS/TRS reception occasions as:
 being within a bandwidth (BW) of the DL BWP, wherein a starting RB of the CSI-RS resource is relative to a first RB of the DL BWP with a lowest index, or
 not being restricted by the BW of the DL BWP, wherein a starting RB of the CSI-RS resource is relative to a common RB with an index 0; and
determining a sub-carrier spacing (SCS) for the periodic CSI-RS/TRS reception occasions is:
 same as a SCS of the DL BWP, or
 provided by the first configuration.

20. The method of claim 19, further comprising determining a spatial reception parameter for the CSI-RS resource in the CSI-RS/TRS reception occasions is same as a spatial reception parameter for a SS/PBCH block in the burst of SS/PBCH blocks.

\* \* \* \* \*